(12) United States Patent
Huh et al.

(10) Patent No.: US 10,419,927 B2
(45) Date of Patent: Sep. 17, 2019

(54) KEY SHARING METHOD AND DEVICE

(71) Applicant: SAMSUNG ELECTRONICS CO., LTD., Suwon-si, Gyeonggi-do (KR)

(72) Inventors: Mi-suk Huh, Suwon-si (KR); Hee-kwan Lee, Seongnam-si (KR); Seog-chung Seo, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 214 days.

(21) Appl. No.: 15/319,537

(22) PCT Filed: Jun. 17, 2015

(86) PCT No.: PCT/KR2015/006104
§ 371 (c)(1),
(2) Date: Dec. 16, 2016

(87) PCT Pub. No.: WO2015/194836
PCT Pub. Date: Dec. 23, 2015

(65) Prior Publication Data
US 2017/0150349 A1 May 25, 2017

(30) Foreign Application Priority Data
Jun. 18, 2014 (KR) .................. 10-2014-0074508

(51) Int. Cl.
*H04W 12/04* (2009.01)
*H04L 9/32* (2006.01)
(Continued)

(52) U.S. Cl.
CPC .......... *H04W 12/04* (2013.01); *H04L 9/3242* (2013.01); *H04W 12/06* (2013.01); *H04L 63/123* (2013.01); *H04L 2209/80* (2013.01); *H04W 12/10* (2013.01)

(58) Field of Classification Search
None
See application file for complete search history.

(56) References Cited

U.S. PATENT DOCUMENTS 7,272,716 B2    9/2007  Haller et al.
7,315,823 B2 *  1/2008  Brondrup .............. G06Q 10/02
                                              705/5
(Continued)

FOREIGN PATENT DOCUMENTS

CN        102422659       4/2012
CN        102842084       12/2012
(Continued)

OTHER PUBLICATIONS

Goodrich, "Using audio in secure device pairing", 2009, pp. 57-67.*
(Continued)

*Primary Examiner* — Benjamin E Lanier
(74) *Attorney, Agent, or Firm* — Nixon & Vanderhye, P.C.

(57) ABSTRACT

Provided is a method, performed by a first device, of sharing a key, the method including: determining a communication method for exchanging a key between the first device and a second device, based on pre-set channel ranking information; receiving a key of the second device from the second device by using the determined communication method; and authenticating the received key of the second device.

14 Claims, 21 Drawing Sheets

(51) Int. Cl.
*H04W 12/06* (2009.01)
*H04L 29/06* (2006.01)
*H04W 12/10* (2009.01)

(56) References Cited

U.S. PATENT DOCUMENTS

| | | | |
|---|---|---|---|
| 7,787,626 B2 | 8/2010 | Brown et al. | |
| 8,068,784 B2 * | 11/2011 | Takayama | H04L 63/045 455/41.2 |
| 8,078,874 B2 | 12/2011 | You et al. | |
| 8,150,419 B2 | 4/2012 | Muhonen et al. | |
| 8,442,234 B2 | 5/2013 | Brown et al. | |
| 8,447,980 B2 | 5/2013 | Godfrey et al. | |
| 8,458,456 B2 | 6/2013 | Niccolini et al. | |
| 8,498,223 B2 | 7/2013 | Kavanaugh | |
| 8,571,519 B2 | 10/2013 | Ginzboorg | |
| 8,661,244 B2 | 2/2014 | Jung et al. | |
| 8,707,454 B1 * | 4/2014 | Statica | H04L 9/0822 726/28 |
| 2003/0093663 A1 | 5/2003 | Walker | |
| 2004/0068649 A1 | 4/2004 | Haller et al. | |
| 2004/0205248 A1 | 10/2004 | Little et al. | |
| 2005/0086477 A1 | 4/2005 | Lin et al. | |
| 2005/0091545 A1 * | 4/2005 | Soppera | G06F 21/64 726/19 |
| 2005/0256866 A1 | 11/2005 | Lu et al. | |
| 2006/0117389 A1 | 6/2006 | Pool | |
| 2006/0218629 A1 | 9/2006 | Pearson et al. | |
| 2007/0010256 A1 * | 1/2007 | Klabunde | A61B 5/0006 455/452.2 |
| 2007/0016781 A1 * | 1/2007 | Asokan | H04L 9/0869 713/173 |
| 2007/0258508 A1 * | 11/2007 | Werb | H04W 84/18 375/140 |
| 2008/0075291 A1 * | 3/2008 | Kamijoh | H04L 9/0836 380/279 |
| 2009/0228294 A1 | 9/2009 | Choi et al. | |
| 2009/0305673 A1 * | 12/2009 | Mardikar | H04L 51/38 455/411 |
| 2010/0284536 A1 | 11/2010 | Brown et al. | |
| 2011/0066849 A1 | 3/2011 | Niccolini et al. | |
| 2011/0081017 A1 * | 4/2011 | Matsushima | H04L 9/0836 380/45 |
| 2011/0211700 A1 * | 9/2011 | Park | H04L 63/061 380/282 |
| 2011/0246370 A1 | 10/2011 | Wang et al. | |
| 2011/0287795 A1 * | 11/2011 | Cahill | H04L 5/0005 455/509 |
| 2013/0007459 A1 | 1/2013 | Godfrey et al. | |
| 2013/0218768 A1 | 8/2013 | Leber | |
| 2013/0232334 A1 | 9/2013 | Brown et al. | |
| 2013/0311694 A1 * | 11/2013 | Bhamidipati | H04M 1/7253 710/303 |
| 2014/0315490 A1 * | 10/2014 | Hughes | H04W 4/008 455/41.2 |
| 2015/0134963 A1 * | 5/2015 | Izu | H04L 63/06 713/171 |
| 2016/0057114 A1 * | 2/2016 | Unagami | H04L 63/0428 713/171 |
| 2016/0057117 A1 * | 2/2016 | Balasingh | H04L 9/30 713/171 |
| 2016/0302137 A1 * | 10/2016 | Escott | H04W 48/16 |

FOREIGN PATENT DOCUMENTS

| | | | |
|---|---|---|---|
| KR | 10-2008-0029766 | 4/2008 | |
| KR | 10-2008-0050936 | 6/2008 | |
| KR | 10-2012-0119788 | 10/2012 | |
| WO | WO-2008021855 A2 * | 2/2008 | ......... G06Q 20/3674 |
| WO | 2008/136639 | 11/2008 | |
| WO | 2012/037618 | 3/2012 | |
| WO | 2014-085525 | 6/2014 | |

OTHER PUBLICATIONS

Mirzadeh, "Secure Device Pairing: A Survey", 2014, pp. 17-39.*
Nguyen, "Authentication protocols based on low-bandwidth unspoofable channels: a comparative survey", 2008, pp. 1-56.*
Search Report and Written Opinion dated Sep. 22, 2015 in counterpart International Patent Application No. PCT/KR2015/006104.
Extended European Search Report dated Dec. 22, 2017 in counterpart European Patent Application No. 15809381.5.
Office Action dated Jul. 24, 2019 in counterpart Chinese Patent Application No. 201580033221.1 and English-language translation.

* cited by examiner

FIG. 20

| DEVICE AND USER INFORMATION $\overset{2001}{\diagup}$ | KEY ID INFORMATION $\overset{2003}{\diagup}$ | VALIDITY DATE INFORMATION $\overset{2005}{\diagup}$ | SHARING HISTORY INFORMATION $\overset{2007}{\diagup}$ | RELIABILITY LEVEL INFORMATION $\overset{2009}{\diagup}$ |
|---|---|---|---|---|
| Alice(Device 2) | Pub_2 | 2015.5 | | 0 |
| Bob(Device 3) | Pub_3 | 2015.4 | | 0 |
| Angela(Device 4) | Pub_4 | 2014.12 | Device 2<br>Device 3 ← Device 5 | 1 |
| Bob(Device 5) | Pub_5 | 2015.1 | Device 3 | 1 |

KEY SHARING METHOD AND DEVICE

This application is the U.S. national phase of International Application No. PCT/KR2015/006104 filed 17 Jun. 2015, which designated the U.S. and claims priority to KR Application No. 10-2014-0074508 filed 18 Jun. 2014, the entire contents of each of which are hereby incorporated by reference.

TECHNICAL FIELD

One or more embodiments relate to a method of sharing a key of a device, and more particularly, to a method and device for sharing a key between devices.

BACKGROUND ART

Recently, content is being frequently shared and voice/video calls made using a device have become general communication methods. However, such communication methods have weak security. Nevertheless, encryption methods for communication between devices are developing because demand for protecting personal information of users of the devices is gradually increasing.

FIG. 1A illustrates a general secret key sharing system 10. In the general secret key sharing system 10, a device receives a secret key distributed by a server, and encrypts data by using the secret key received from the server. However, in the general secret key sharing system 10, the server provides the same secret key to devices, and thus security is vulnerable.

FIG. 1B illustrates a general public key sharing system 20. In the general public key sharing system 10, devices exchange a public key and encrypt data by using the exchanged public key. However, in order to safely exchange the public keys between the devices, each device needs to have a certificate, and the certificate needs to be separately exchanged. Also, when the devices that do not have a certificate exchange a public key, the devices are vulnerable to a man-in-the-middle (MITM) attack.

A method of exchanging a key required for communication between devices through a certain application may be used, but it is difficult for a user to determine a suitable communication method according to circumstances.

DETAILED DESCRIPTION OF THE INVENTION

Technical Problem

One or more embodiments include a method of safely sharing a key.

Technical Solution

One or more embodiments include a key sharing method of a device based on a reliability relationship.

DESCRIPTION OF THE DRAWINGS

FIG. 20 is a table for describing sharing history information and reliability level information about a key, according to an embodiment.

BEST MODE

Figure 1A:
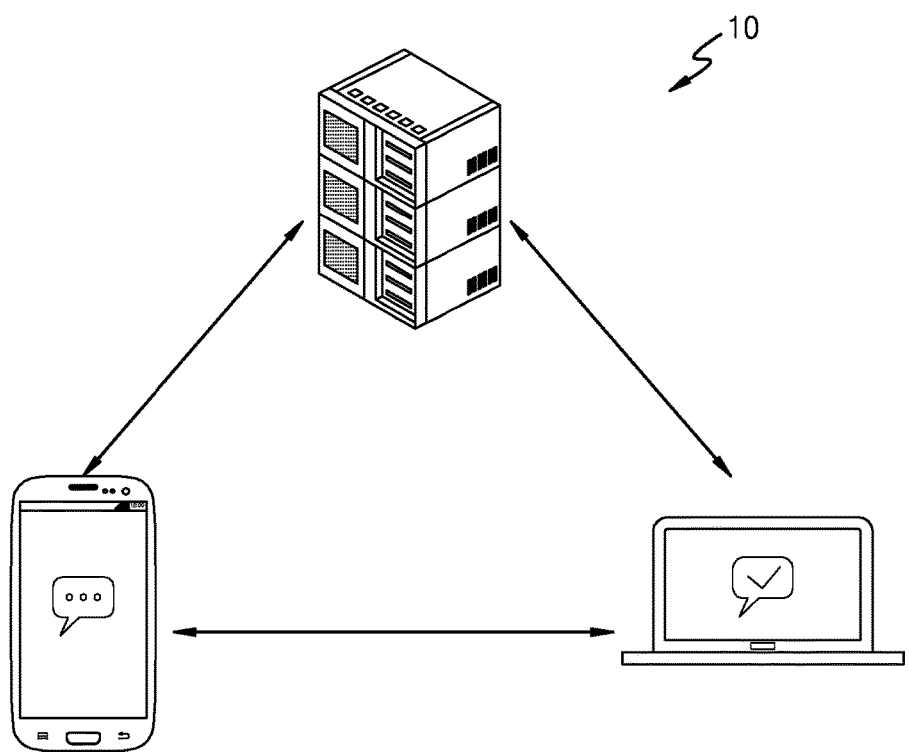
FIGS. 1A and 1B are diagrams of general key sharing systems.

According to one or more embodiments, a method, performed by a first device, of sharing a key, the method includes: determining a communication method for exchanging a key between the first device and a second device, based on pre-set channel ranking information; receiving a key of the second device from the second device by using the determined communication method; and authenticating the received key of the second device.

The authenticating of the received key of the second device may include: determining an authentication method of the key of the second device based on the determined communication method; and authenticating the key of the second device according to the determined authentication method.

When the determined communication method is a short-range communication method, the authenticating of the key of the second device may include: outputting a short authentication string (SAS) for authenticating the key of the second device; and selectively receiving an input of a user regarding the output SAS.

When the determined communication method is a long-range communication method, the authenticating of the key of the second device may include: receiving a hash value of the key of the second device via a short message service (SMS); calculating a hash value of the received key of the second device by using a hash function; and comparing the calculated hash value and the hash value received via the SMS.

The pre-set channel ranking information may include information about priorities of communication channels, which are determined based on at least one of preference information of the first device, information about a distance between the first and second devices, and channel information established between the first and second devices.

The determining of the communication method may further include setting a communication channel with respect to the second device according to the determined communication method, and the receiving of the key of the second device may include: receiving the key of the second device through the set communication channel; and transmitting a key of the first device to the second device through the set communication channel.

The method may further include generating a master key used for communication with the second device, based on the key of the second device.

The method may further include: transmitting, to the second device, a request for a key of a third device; receiving, from the second device, the key of the third device and sharing information about the key of the third device; updating the sharing information about the key of the third device; and storing the key of the third device and the sharing information about the key of the third device.

The method may further include: receiving, from the second device, a request for a key of a third device; updating sharing information about the key of the third device; and transmitting the key of the third device and the sharing information about the key of the third device.

The method may further include storing the key of the second device based on a result of the authenticating.

The method may further include: generating sharing information about the key of the second device; and storing the sharing information about the key of the second device.

The sharing information about the key of the second device may include sharing history information including information about devices sharing a key of a third device and information about a sharing order of the key of the third device.

According to one or more embodiments, a method, performed by a first device, of sharing a key, the method includes: requesting a second device for a key of a third device; receiving, from the second device, the key of the third device and sharing information about the key of the third device; and storing the received key of the third device and the received sharing information about the key of the third device.

The sharing information about the key of the third device may include sharing history information including information about devices sharing the key of the third device and information about a sharing order of the key of the third device.

The sharing information about the key of the third device may include at least one of validity date information of the key of the third device, hash value information of the key of the third device, and information of the third device.

The method may further include: updating the sharing history information about the received key of the third device; and storing the sharing history information about the key of the third device.

The method may further include: receiving, from a fourth device, a request for the key of the third device; updating the sharing history information about the key of the third device; storing the key of the third device and the sharing history information about the key of the third device; and transmitting, to the fourth device, the received key of the third device and the updated sharing history information about the key of the third device.

The method may further include: encrypting data by using the received key of the third device; and transmitting the encrypted data to the third device.

The storing of the received key of the third device and the received sharing information about the key of the third device may include mapping user information of the third device and the sharing information about the key of the third device.

The third device may include a plurality of devices, and the key of the third device may include keys respectively corresponding to keys of the plurality of devices.

According to one or more embodiments, a computer-readable recording medium has recorded thereon a program which, when executed by a computer, performs the method.

According to one or more embodiments, a first device sharing a key with a second device, the first device includes: a communication method determiner configured to determine a communication method for exchanging a key between the first and second devices, based on pre-set channel ranking information; a transmitter configured to transmit a key of the first device to the second device by using the determined communication method; a receiver configured to receive a key of the second device from the second device by using the determined communication method; and an authenticator configured to authenticate the received key of the second device.

The authenticator may be further configured to determine an authentication method of the key of the second device based on the determined communication method, and authenticate the key of the second device according to the determined authentication method.

The first device may further include an output unit, wherein, when the determined communication method is a short-range communication method, the authenticator may be further configured to control the output unit to output a short authentication string (SAS) for authenticating the key of the second device, and to selectively receive an input of a user regarding the output SAS.

When the determined communication method is a long-range communication method, the authenticator may be further configured to receive, through the receiver, a hash value of the key of the second device via a short message service (SMS), calculate a hash value of the received key of the second device by using a hash function, and compare the calculated hash value and the hash value received via the SMS.

The pre-set channel ranking information may include information about priorities of communication channels, which are determined based on at least one of preference information of the first device, information about a distance between the first and second devices, and channel information established between the first and second devices.

The communication method determiner may set a communication channel with the second device according to the determined communication method, and the transmitter may transmit the key of the first device to the second device through the set communication channel.

The authenticator may generate a master key used for communication with the second device, based on at least one of the key of the first device and the key of the second device.

The first device may further include a key manager and a key storage unit, wherein the transmitter may transmit, to the second device, a request for a key of a third device, the receiver may receive, from the second device, the key of the third device and sharing information about the key of the third device, the key manager may update the sharing information about the key of the third device, and the key storage unit may store the key of the third device and the sharing information about the key of the third device.

The first device may further include a key manager, wherein the receiver receives, from the second device, a request for a key of a third device, the key manager updates sharing information about the key of the third device, and the transmitter may transmit the key of the third device and the sharing information about the key of the third device.

The first device may further include a key storage unit, wherein the key storage unit stores the key of the second device based on a result of the authenticating.

The first device may further include a key manager and a key storage unit, wherein the key manager may generate sharing information about the key of the second device, and the key storage unit may store the sharing information about the key of the second device.

The sharing information about the key of the second device may include sharing history information including information about devices sharing the key of the third device and information about a sharing order of the key of the third device.

According to one or more embodiments, a first device sharing a key with a second device, the first device includes: a transmitter configured to request the second device for a key of a third device; a receiver configured to receive, from the second device, the key of the third device and sharing information about the key of the third device; and a key storage unit configured to store the received key of the third device and the received sharing information about the key of the third device.

The sharing information about the key of the third device may include sharing history information comprising information about devices sharing the key of the third device and information about a sharing order of the key of the third device.

The sharing information about the key of the third device may include at least one of validity date information of the key of the third device, hash value information of the key of the third device, and information of the third device.

The first device may further include a key manager, wherein the key manager may be configured to update the sharing history information about the key of the third device, and the key storage unit may be configured to store the sharing history information about the key of the third device.

The first device may further include a key manager, wherein the receiver may be configured to receive, from a fourth device, a request for the key of the third device, the key manager may be configured to update the sharing history information about the key of the third device, the key storage unit may be configured to store the key of the third device and the sharing history information about the key of the third device, and the transmitter may be configured to transmit, to the fourth device, the received key of the third device and the updated sharing history information about the key of the third device.

The first device may further include an encryptor, wherein the encryptor may encrypt data by using the received key of the third device, and the transmitter may transmit the encrypted data to the third device.

The key storage unit may include an information mapping unit configured to map user information of the third device and the sharing information about the key of the third device.

The third device may include a plurality of devices, and the key of the third device may include keys respectively corresponding to keys of the plurality of devices.

Mode of the Invention

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

In the specification, when a region is "connected" to another region, the regions may not only be "directly connected", but may also be "electrically connected" via another device therebetween. Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software.

In the specification, examples of a device may be a personal computer (PC), a cellular phone, a smart phone, a television (TV), a tablet PC, a laptop, a personal digital assistant (PDA), a portable multimedia player (PMP), a navigation device, an MP3 player, and a digital camera, but are not limited thereto and may include various devices.

In the specification, a key of a device may include a public key (an asymmetric key), and additionally include a secret key (a symmetric key). A key of a device may be data used for encryption communication between devices, and may be generated through a key calculation algorithm stored in the device. Examples of the key calculation algorithm may include various algorithms, such as Advanced Encryption Standard (AES), Message-Digest Algorithm 5 (MD5), and Elliptic Curve Diffie-Hellman (ECDH), but are not limited thereto. Since the key calculation algorithm is well known to one of ordinary skill in the art, details thereof are not provided herein.

In the specification, a key exchange may be processes of a first device and a second device exchanging at least one of a key of the first device and a key of the second device. In other words, a key exchange may be processes of exchanging keys of two devices between the two devices.

In the specification, key sharing may be processes of a first device and a second device exchanging not only a key of the first device and a key of the second device, but also a key of a third device. In other words, a key of another device other than two devices may be exchanged. Here, the key sharing may include a concept of a key exchange.

In the specification, a short-range communication method may be a communication method in which communication is possible only when two devices are within a predetermined range, and may be, for example, Bluetooth or near-field communication (NFC), but is not limited thereto.

In the specification, a long-range communication method may be a communication method in which communication is possible irrelevantly to a distance between two devices.

For example, according to the long-range communication method, two devices may communicate with each other through a relay, such as an access point (AP), even when a distance between the two devices is equal to or higher than a predetermined distance. Examples of the long-distance communication method may include communication methods using a cellular network, such as short message service (SMS) or a phone call, but are not limited thereto.

Figure 2:
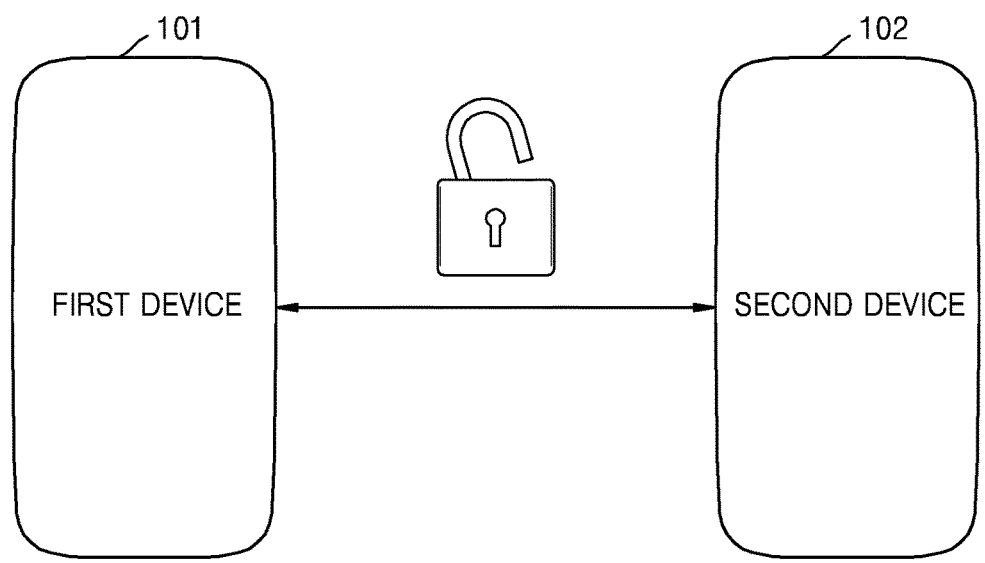
FIG. 2 illustrates a system for describing a key exchange between devices, according to an embodiment.

FIG. 2 illustrates a system for describing a key exchange between devices, according to an embodiment.

According to an embodiment, a first device 101 may communicate with a second device 102. The first device 101 may encrypt and then transmit data when communicating with the second device 102.

According to an embodiment, information required for the second device 102 to encrypt and transmit data to the first device 101 is a key of the first device. In other words, a key of a first device may be information required for another device, such as a second device, to encrypt and transmit data to the first device. Like the key of the first device, a key of the second device may be information required for another device, such as the first device, to encrypt and transmit data to the second device.

According to an embodiment, the first device 101 may receive the key of the second device from the second device 102. Here, the first device 101 may also transmit the key of the first device to the second device 102.

According to an embodiment, the first device 101 may determine a communication method with the second device 102 and for a key exchange between the first device 101 and the second device. According to an embodiment, examples of the communication method may include a long-range communication method and a short-range communication method.

According to an embodiment, the first device 101 may determine the communication method with the second device 102 based on pre-set channel ranking information. According to an embodiment, the pre-set channel ranking information may include information about priorities of communication channels, which are determined based on at least one of preference information of the first device 101, information about a distance between the first device 101 and the second device, and channel information established between the first device 101 and the second device 102.

In other words, channel ranking information according to an embodiment is criterion information for determining a communication channel and a communication method suitable to circumstances, and the first device 101 may determine the communication method with the second device 102 according to the channel ranking information. According to an embodiment, the first device 101 may determine a method of authenticating the key of the second device received from the second device 102. According to an embodiment, the first device 101 may determine the authentication method based on the communication method determined for the key exchange with the second device 102.

According to an embodiment, the first device 101 may authenticate the received key of the second device, and store the key of the second device based on a result of the authentication.

Also, according to an embodiment, the first device 101 may receive a key of a third device from the second device 102. In other words, when the second device 102 stores a key of a third device (not shown), the first device 101 may request the second device 102 for the key of the third device. In other words, the first device 101 may request and receive a key of another device stored in the second device 102.

According to an embodiment, when the first device 101 receives a key of another device, such as the key of the third device, the first device 101 may receive sharing information about the key of the third device. The first device 101 may determine reliability of the key of the third device based on sharing history information included in the sharing information about the key of the third device.

Also, according to an embodiment, the first device 101 may communicate with the third device by using the key of the third device received from the second device 102. In other words, by receiving the key of the third device from the second device 102, the first device 101 may perform encryption communication with the third device without having to directly exchange a key with the third device, as will be described in detail below with reference to FIG. 5.

According to an embodiment, by selecting a communication method suitable to circumstances of a device, a method of safely sharing a key is provided and thus encryption is possible using a shared key at a point of time when actual content needs to be safely shared. Also, according to an embodiment, a key or algorithm may be provided such that encryption/decryption is performed according to each application executed by the first device 101. In addition, according to an embodiment, the first device 101 and the second device 102 may use common parameter information so as to simplify negotiation processes and reduce communication overhead. Also, a key exchange of a device may be performed by using a peer-to-peer communication method between devices, without having to use an authentication server.

Figure 3:
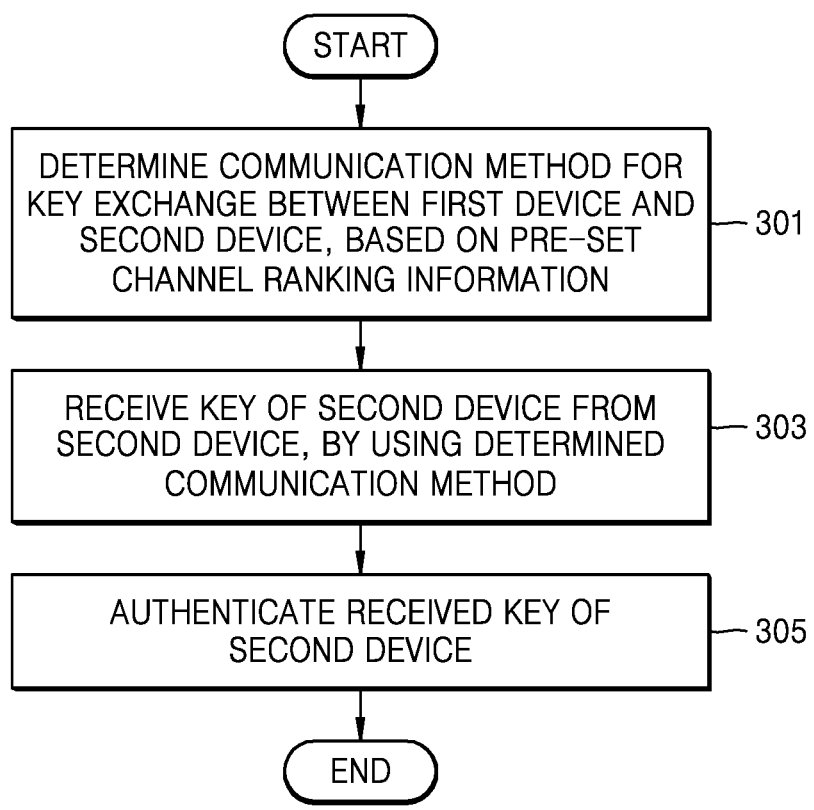
FIG. 3 is a flowchart of a key exchange method according to an embodiment.

FIG. 3 is a flowchart of a key exchange method according to an embodiment.

In operation 301, a first device may determine a communication method for a key exchange between the first device and a second device, based on pre-set channel ranking information.

According to an embodiment, channel ranking information may include information about priorities between communication channels, which are determined based on at least one of preference information of the first device, information about a distance between the first and second devices, and channel information established between the first and second devices.

According to an embodiment, the preference information of the first device is preference information about a communication method preferred by the first device, and may include information about priorities of communication methods pre-set by a user of the first device. Also, the channel ranking information may be determined through an input of a user during the key exchange.

In other words, the channel ranking information according to an embodiment is criterion information for determining a communication channel suitable to circumstances, and the first device may determine a method of communicating with the second device according to the channel ranking information. For example, the first device may store channel ranking information set to first determine a communication method based on a user input, and as a secondary plan, determine a communication method based on the distance between the first and second devices. Also, the first device may store channel ranking information that is set such that, when a communication channel pre-set between the first and second devices exists, the pre-set communication method is used.

For example, when the second device is within a predetermined distance of the first device, the first device may select a short-range communication method, and when the second device is not within the predetermined distance of the first device, the first device may select a long-range communication method. Here, the first device may select one of various short-range communication methods based on the distance, may determine priorities of communication methods by setting preferences of the communication methods based on an input of the user of the first device, or may determine a communication method by receiving an input of the user while performing the key exchange. In other words, the first device may determine a communication method most suitable to circumstances and conditions of the first device.

According to an embodiment, the first device may set a communication channel with the second device according to the determined communication method. For example, when the first device determined a Bluetooth communication method as a key exchange method with the second device, the first device may set a communication channel according to the Bluetooth communication method with the second device. The first device may transmit a key of the first device to the second device or may receive a key of the second device from the second device, through the set communication channel.

In addition, the first device may determine a communication method for the key exchange between the first and second devices according to negotiation by the second device.

In operation 303, the first device may receive the key of the second device from the second device by using the determined communication method.

According to an embodiment, the first device may receive the key of the second device from the second device according to the communication method determined in operation 301. For example, the first device may receive the key of the second device through near-field communication (NFC) method or may receive the key of the second device or a hash value of the key of the second device by using a short message service (SMS). Also, the first device may receive the key of the second device through a network, such as Wi-Fi.

In addition, according to an embodiment, the first device may transmit the key of the first device to the second device. In other words, when the number of keys required for communication between the first and second devices is one, one of the first and second devices may generate and provide a key, but when a key required to encrypt data to be transmitted from the first device to the second device and a key required to encrypt data to be transmitted from the second device to the first device are different, the first and second devices may both generate keys and exchange the keys.

In operation 305, the first device may authenticate the received key of the second device.

According to an embodiment, the first device may determine whether the received key of the second device is accurate.

For example, the first device may output a short authentication string (SAS) based on the received key of the second device. Also, the second device may also output an SAS based on the key of the second device. Since the key of the second device stored in the second device is accurate, the SAS output from the second device and the SAS output from the first device are the same, the first device may authenticate that the received key of the second device is accurate.

According to an embodiment, the first device may determine an authentication method based on the communication method determined in operation 301. For example, when the first device received the key of the second device from the second device through a long-range communication method, the first device may receive the hash value of the key of the second device by using SMS of a cellular network. The first device may calculate a hash value of the key of the second device received in operation 303 by using a hash function, and compare the calculated hash value and the received hash value to authenticate the received key of the second device.

According to an embodiment, the SMS is a method of transmitting a limited message by using a control data format of the cellular network, and is reliable because a risk of hacking attempts is very low. Accordingly, the first device may authenticate the key of the second device by comparing the key of the second device or the hash value of the key of the second device, which is received via SMS, and the key of the second device, which is received by using data communication. In addition, according to an embodiment, the first device may output a value of the key of the second device, which is received via SMS, and the calculated hash value of the key of the second device, and may receive a user input regarding the output results.

According to an embodiment, when the first device determined to receive the key of the second device from the second device by using a short-range communication method, the first device may output SAS based on the key of the second device received in operation 303. The second device may also output SAS based on the key of the second device.

According to an embodiment, because the first and second devices using the short-range communication method are within a predetermined range, the user of the first device or a user of the second device may compare the SASs output from the first and second devices to perform authentication. In addition, the first device may selectively receive a user input regarding the output SAS.

According to an embodiment, the first device may store the received key of the second device based on a result of the authentication. Also, the first device may generate sharing information about the received key of the second device.

According to an embodiment, sharing information may include at least one of information about devices sharing a key of a device, sharing history information, validity date information of the key of the device, hash value information of the key of the device, information about the device, and information about a user of the device.

According to an embodiment, the information about the devices sharing the key of the device may include information about which device stores the key of the device. For example, information about devices sharing the key of the second device may include information about devices storing the key of the second device.

According to an embodiment, the sharing history information about the key of the device may include information about a sharing order of the key of the device. In other words, the sharing history information may include information about a flow of providing the key of the device. For example, sharing history information about a key of a third device may include information indicating that the key of the third device has been provided to a first device through a fourth device and a second device.

Also, according to an embodiment, the first device may generate a master key used for communication with the second device, based on the key of the second device. According to an embodiment, the master key may be a key used for encryption and decryption of all types of communication between the first and second devices.

In addition, according to an embodiment, the first device may transmit a request for a key of a third device to the second device. In other words, according to an embodiment, the first device may request for a key of another device stored in the second device, and receive the key of the third device and sharing information of the third device, from the second device.

According to an embodiment, the first device may store the received key of the third device, and update the sharing information of the third device. According to an embodiment, the updating of the sharing information may indicate an operation of adding details to the sharing history information, or amending information about the third device or about the key of the third device, which is stored in the first device. Also, the first device may store the key of the third device and the sharing information about the key of the third device.

According to an embodiment, when the first device is storing the key of the third device, the first device may receive, from the second device, a request for the key of the third device. In other words, the first device may receive, from the second device, a request for a key of another device stored in the first device, and transmit the key of the third device and the sharing information about the key of the third device to the second device. Also, before transmitting the sharing information, the first device may update the sharing information about the key of the third device, and provide, to the second device, the updated sharing information about the key of the third device and the key of the third device.

Figure 4:
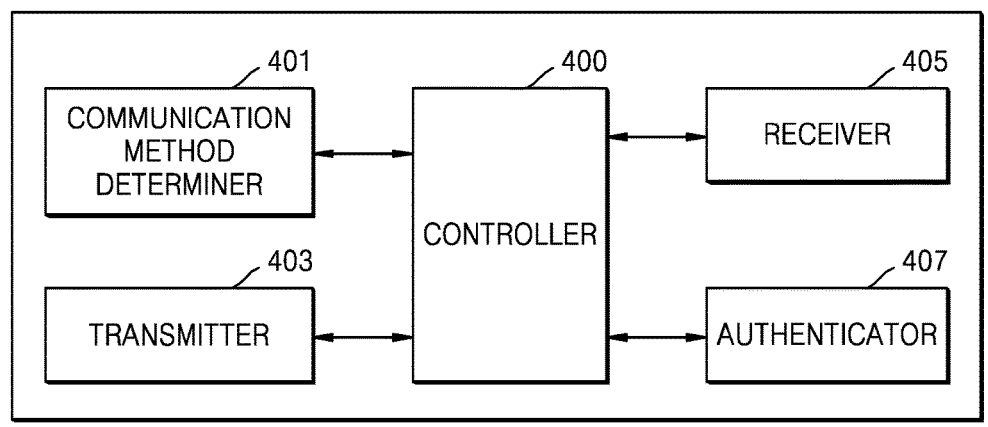
FIG. 4 is a block diagram of a device for exchanging a key, according to an embodiment.

FIG. 4 is a block diagram of a device for exchanging a key, according to an embodiment.

According to an embodiment, the device 101 for exchanging a key, which is shown in FIG. 4, may be the first device 101 shown in FIG. 2. The first device 101 may include a communication method determiner 401, a transmitter 403, a receiver 405, and an authenticator 407. In addition, the first device 101 may include a controller 400.

According to an embodiment, the communication method determiner 401 may determine a communication method based on pre-set channel ranking information. In other words, the communication method determiner 401 may determine a communication method for a key exchange with a second device. Channel ranking information is criterion information for determining priorities of communication methods, and corresponds to details described with reference to FIG. 2.

According to an embodiment, the communication method determiner 401 may perform channel setting according to the determined communication method.

According to an embodiment, the transmitter 403 may transmit a key of the first device to the second device by using the communication method determined by the communication method determiner 401. For example, when the communication method determiner 401 selects a Bluetooth communication method from among short-range communication methods and sets a Bluetooth communication channel with the second device, the transmitter 403 may transmit the key of the first device to the second device through the Bluetooth communication channel.

Also, according to an embodiment, the transmitter 403 may transmit, to the second device, a request for a key of a third device. In other words, the transmitter 403 may transmit a request for a key of another device, which is stored in the second device. The receiver 405 may receive, from the second device, the key of the other device and sharing information about the key of the other device.

According to an embodiment, the receiver 405 may receive the key of the second device by using the communication method determined by the communication method determiner 401. For example, when the communication method determiner 401 selects an NFC method from among short-range communication methods, and sets an NFC channel, the receiver 405 may receive, from the second device, the key of the second device through the NFC channel.

Also, according to an embodiment, the receiver 405 may receive, from the second device, a request for the key of the third device. In other words, the receiver 405 may receive a request for a key of another device, which is stored in the first device 101. The first device 101 may transmit, through the transmitter 403, a key of the other device, which is stored in the first device, to the second device. Also, the first device 101 may transmit sharing information about the key of the other device.

According to an embodiment, the authenticator 407 may authenticate the key of the second device received by the receiver 405. Also, the authenticator 407 may determine an authentication method of the second device based on the communication method determined by the communication method determiner 401.

According to an embodiment, when the communication method determiner 401 selects a short-range communication method, the authenticator 407 may control an output unit (not shown) to output SAS to authenticate the key of the second device. According to an embodiment, SAS may be generated based on the key of the second device, and may include at least one of an image, text, and a video. The authenticator 407 may selectively receive a user input regarding the output SAS. In other words, the authenticator 407 may receive, from a user of the first device, an input regarding whether the key of the second device received based on SAS is accurate.

Also, according to an embodiment, when the communication method determiner 401 selects a long-range communication method, the authenticator 407 may receive, through the receiver 405, a hash value of the key of the second device via SMS, and calculate a hash value of the received key of the second device by using a hash function stored in the device. Also, the authenticator 407 may compare the calculated hash value and the hash value received via SMS to determine whether the received key of the second device is accurate.

According to an embodiment, a hash function may be received from the second device or may be pre-stored in the first device, and an algorithm of the hash function is not limited.

Also, according to an embodiment, the authenticator 407 may generate a master key used for communication between the first device and the second device based on at least one of the key of the first device and the key of the second device. According to an embodiment, the master key may be a key used for encryption or decryption of all types of communication between the first device and the second device.

Also, according to an embodiment, the first device 101 may store the received key of the second device based on a result of the authenticating of the authenticator 407. Also, the first device 101 may generate and store sharing information about the key of the second device. The sharing information has been described above.

In addition, according to an embodiment, the first device 101 may update sharing information about the received key of the second device or about a key of another device. In other words, the first device 101 may update sharing history information, validity date information, etc. in the sharing information.

According to an embodiment, the first device 101 may include the controller 400. Generally, the controller may control overall operations of the first device 101. Also, according to an embodiment, the controller 40 may include an operation unit such as a central control apparatus or may be included in another element, but is not limited thereto.

Figure 5:
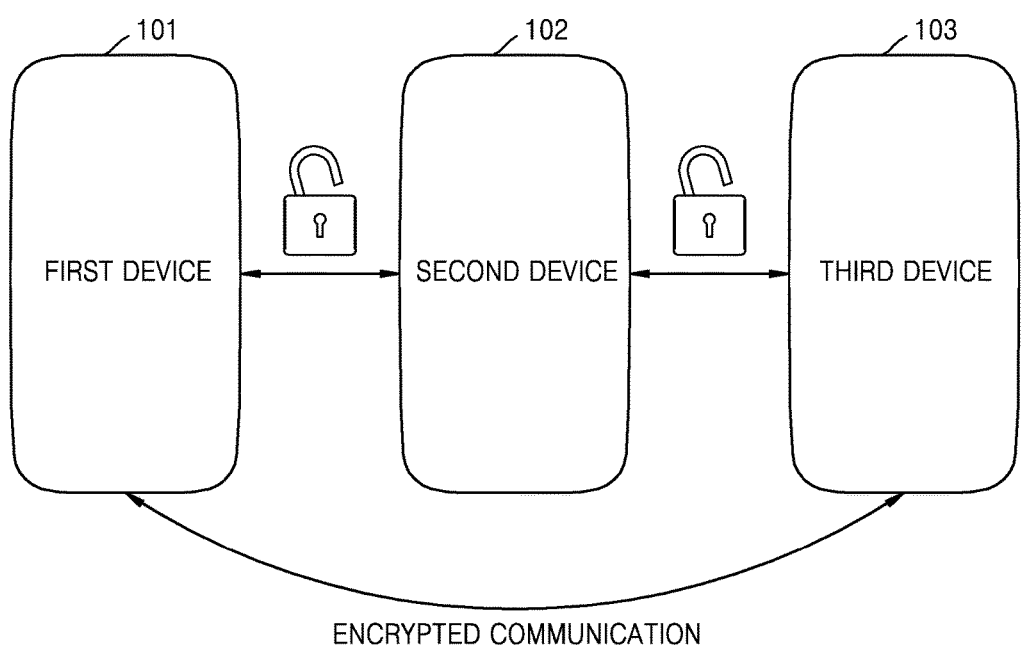
FIG. 5 illustrates a system for describing a key sharing method according to an embodiment.

FIG. 5 illustrates a system for describing a key sharing method according to an embodiment.

According to an embodiment, the first device 101 may exchange a key with the second device 102. Also, the second device 102 may exchange a key with a third device 103.

According to an embodiment, when the second device 102 exchanged a key with the third device 103 and thus stores a key of the third device, the first device 102 may request for a key of the third device stored in the third device 103. In other words, the second device 102 may share a key of another device stored in the second device 102 with the first device 101.

According to an embodiment, the second device 102 may store keys of a plurality of devices. In other words, when the second device 102 stores the keys of the plurality of devices received from the plurality of devices, the second device 102 may provide the keys of the plurality of devices to the first device 101.

According to an embodiment, the first device 101 may perform encryption communication with the third device 103 by using the key of the third device, which is received from the second device 102. In other words, according to an embodiment, the first device 101 may perform encryption communication with the third device 103 by using the key of the third device, which is received from the second device 102, without having to directly exchange a key with the third device 103. Here, the first device 101 may directly exchange a key with the third device 103.

According to an embodiment, the first device 101 may receive sharing information about the key of the third device. The sharing information about the key of the third device may include sharing information about devices sharing the key of the third device. In other words, the sharing information may include information for identifying devices storing the key of the third device. Also, the sharing information about the key of the third device may include sharing history information including information about a sharing order of the key of the third device. The sharing history information about the key of the third device may include information about which device the key of the third device passed through to reach the first device. In addition, the sharing information about the key of the third device may include at least one of validity date information of the key of the third device, hash value information of the key of the third device, key identification (ID) information for identifying the key of the third device, user information of the third device, and information of the third device.

According to an embodiment, the first device may determine a reliability level about the key of the third device, based on the sharing history information about the key of the third device. According to an embodiment, a reliability level of a key is information about a depth determined according to at least one of sharing information and sharing history information in the sharing information, and may indicate how reliable the key is.

For example, when the key of the third device is transmitted to the first device through another device unidentifiable by the first device, the first device may determine a reliability level of the key of the third device to be low. Accordingly, the first device may determine a reliability level of a key of each device, and also, the first device may be set to exclude or not to store a key of a device received through a certain device or a device unidentifiable by the first device. In addition, the first device may be set to exclude or not to store a key of a device received through at least a certain number of devices. Also, the first device may store the information about the reliability level in the sharing information or separately from the sharing information. Details about the reliability level will be described below with reference to FIG. 20.

According to an embodiment, the first device may manage the received key of the second device or the received key of the third device. For example, the first device may map a key stored in the first device with another device or user information, and store mapped information. Also, the first device may manage a key of a device together with address book or phone book information stored in the first device. According to an embodiment, managing of a key of a device may include updating, backing up, or updating of the key, and may include storing, backing up, and updating of sharing information about the key of the device, but is not limited thereto.

Figure 6:
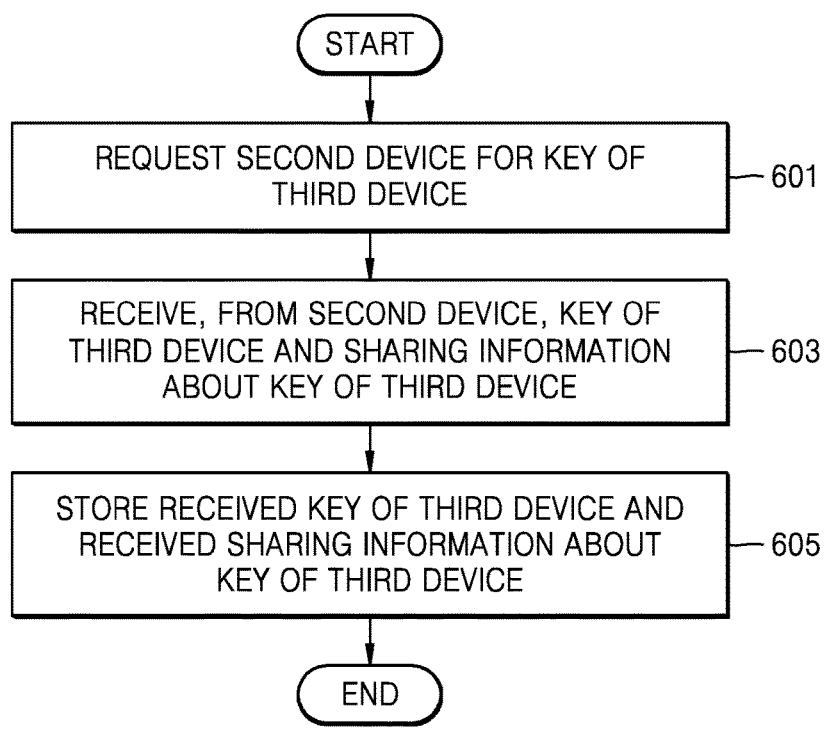
FIG. 6 is a flowchart of a key sharing method according to an embodiment.

FIG. 6 is a flowchart of a key sharing method according to an embodiment.

In operation 601, a first device may request a second device for a key of a third device.

According to an embodiment, the first device may request the second device for a key of another device, which is stored in the second device.

Also, according to an embodiment, the first device may transmit the request to the second device through a communication channel connected between the first device and the second device, and the request may be encrypted. In other words, as described with reference to FIG. 3, the first device may set a communication channel with the second device, exchange a key with the second device, encrypt the request for the key of the third device based on a received key of the second device, and transmit the request to the second device.

In operation 603, the first device may receive, from the second device, the key of the third device and sharing information about the key of the third device.

According to an embodiment, the sharing information about the key of the third device may include at least one of sharing history information that is information about a sharing order of the key of the third device, validity date information of the key of the third device, hash value information of the key of the third device, information of the third device, and user information of the third device.

Also, according to an embodiment, the first device may update sharing information about the received key of the third device. For example, the first device may update the information of the third device, the user information of the third device, the validity date information, the hash value information of the key of the third device, the information about the key of the third device, or the sharing history information of the third device, which is stored in the first device.

In operation 605, the first device may store the received key of the third device and the received sharing information about the key of the third device.

Also, according to an embodiment, the first device may update the sharing information about the key of the third device, and store the updated sharing information about the key of the third device.

According to an embodiment, the third device may include a plurality of devices. In other words, the first device not only request the second device for a key of only one device and receive the key from the second device, but may also request the second device for key of a plurality of devices and receive the keys from the second device.

In addition, according to an embodiment, the first device may encrypt data by using the key of the third device and transmit the encrypted data to the third device. In other words, according to an embodiment, the first device may perform encrypted communication without having to directly receive a key from the third device.

Also, according to an embodiment, the first device may map the user information of the third device with the received key of the third device and the sharing information about the key of the third device, and store the mapped information. In other words, the first device may store the sharing information about the key of the third device after mapping the sharing information with the user information of the third device, which is stored in the first device.

Also, according to an embodiment, the first device may receive, from a fourth device, a request for the key of the third device. According to an embodiment, the first device may update the sharing history information about the key of the third device, and transmit the updated sharing history information to the fourth device. In other words, the first device may receive, from the fourth device, a request for a key of another device stored in the first device.

Figure 7:
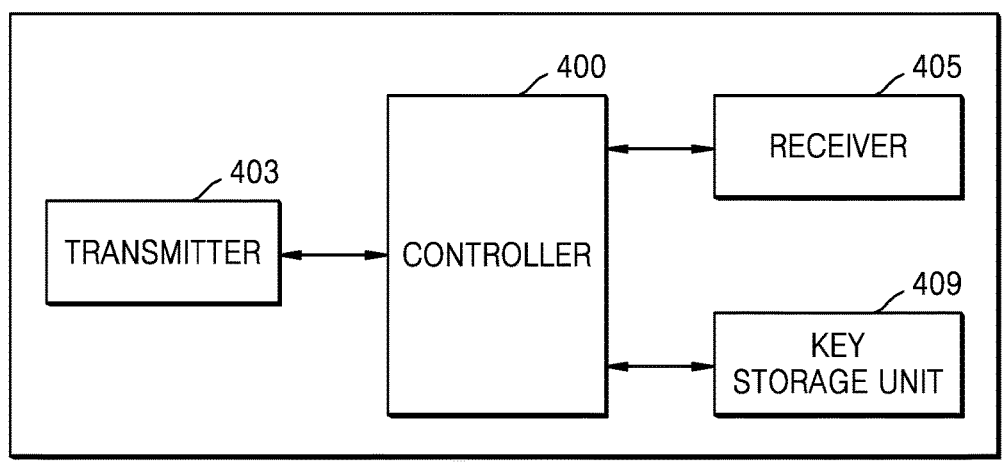
FIG. 7 is a block diagram of a device for sharing a key, according to an embodiment.

FIG. 7 is a block diagram of a device for sharing a key, according to an embodiment.

Figure 1B:
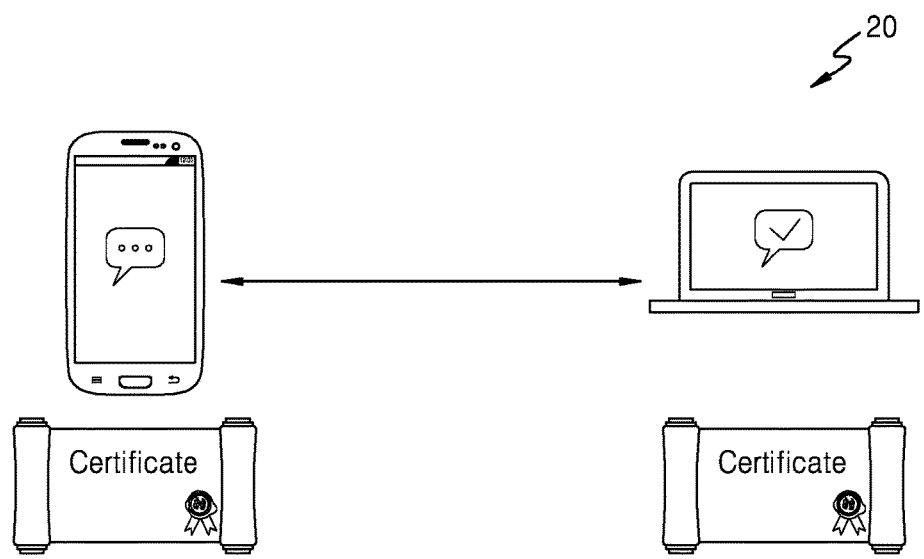

The device for sharing a key may be the first device 101 of FIG. 1 or 5.

According to an embodiment, the first device 101 may include the transmitter 403, the receiver 405, and a key storage unit 409.

According to an embodiment, the transmitter 403 may request a second device for a key of a third device. In other words, the transmitter 403 may request for a key of another device stored in the second device.

According to an embodiment, the transmitter 403 may transmit a request for the key of the third device through a communication channel connected between the first device and the second device. Also, the request for the key of the third device may be encrypted and transmitted.

According to an embodiment, the receiver 405 may receive, from the second device, the key of the third device and sharing information about the key of the third device.

According to an embodiment, the sharing information about the key of the third device may include at least one of sharing history information that is information about a sharing order of the key of the third device, validity date information of the key of the third device, hash value information of the key of the third device, information of the third device, and user information of the third device.

According to an embodiment, the first device 101 may update the sharing information about the received key of the third device, as described above with reference to FIG. 6.

According to an embodiment, the key storage unit 409 may store the received key of the third device and the received sharing information about the key of the third device. Also, according to an embodiment, the key storage unit 409 may map and store the key of the third device and the sharing information about the key of the third device with the user information of the third device.

According to an embodiment, the first device 101 may encrypt data by using the key of the third device, and transmit the encrypted data to the third device through the transmitter 403. In other words, according to an embodiment, the first device may perform encrypted communication with the third device without having to directly receive the key from the third device.

Also, according to an embodiment, the receiver 405 may receive, from a fourth device, a request for the key of the third device. According to an embodiment, the first device may update the sharing history information about the key of the third device, and the transmitter 403 may transmit, to the fourth device (not shown), the key of the third device and the sharing history information about the key of the third device. In other words, the receiver 405 may receive, from the fourth device, a request for a key of another device stored in the first device.

According to an embodiment, the first device 101 may include the controller 400. Generally, the controller may control overall operations of the first device 101. Also, according to an embodiment, the controller 400 may include an operation unit, such as a central control apparatus, and may be included in another element, but is not limited thereto.

Figure 8:
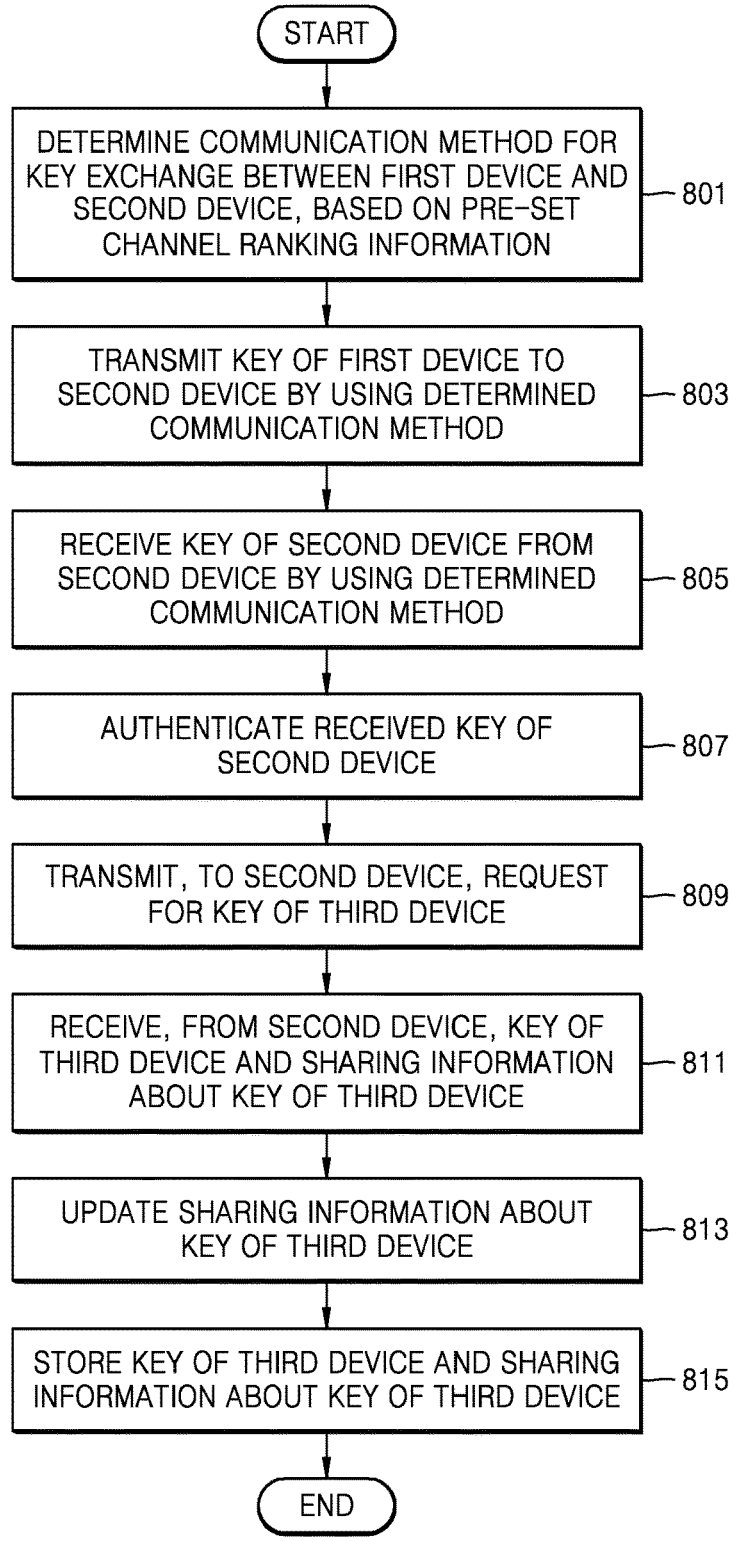
FIG. 8 is a detailed flowchart of key exchange and key sharing methods according to an embodiment.

FIG. 8 is a detailed flowchart of key exchange and key sharing methods according to an embodiment.

In operation 801, a first device may determine a communication method for a key exchange between the first device and a second device, based on pre-set channel ranking information. Since operation 801 corresponds to operation 301, details thereof are not provided again.

In operation 803, the first device may transmit a key of the first device to the second device by using the communication method determined by the first device. In other words, the first device may receive a key of the second device from the second device or may transmit the key of the first device to the second device, by using the communication method determined by the first device.

In operation 805, the first device may receive the key of the second device from the second device by using the determined communication method, which corresponds to operation 303 of FIG. 3.

In operation 807, the first device may authenticate the received key of the second device, which corresponds to operation 305 of FIG. 3.

In operation 809, the first device may transmit, to the second device, a request for a key of a third device.

According to an embodiment, the first device may request the second device for a key of another device stored in the second device together with the key of the third device, as well as the key of the second device.

In operation 811, the first device may receive, from the second device, the key of the third device and sharing information about the key of the third device.

According to an embodiment, the first device may receive, from the second device, the key of the third device and the sharing information about the key of the third device by using the communication method determined in operation 801.

Also, according to an embodiment, the second device may encrypt and transmit, to the first device, the key of the third device and the sharing information about the key of the third device, by using the key of the first device received in operation 803.

In operation 813, the first device may update the sharing information about the key of the third device.

According to an embodiment, the first device may update the sharing information about the key of the third device after receiving the key of the third device, or may update the sharing information about the key of the third device before transmitting the key of the third device to another device.

In operation 815, the first device may store the key of the third device and the sharing information about the key of the third device.

According to an embodiment, the first device may map and store the key of the third device and the sharing information about the key of the third device, or map and store the key of the third device, the sharing information about the key of the third device, the information of the third device, and the user information of the third device.

In addition, according to an embodiment, the sharing information about the key of the third device may be included in or may exist separately from the key of the third device. The key of the third device and the sharing information about the key of the third device may include ID information to be distinguished from a key of another device or sharing information of the key of the other device.

Figure 9:
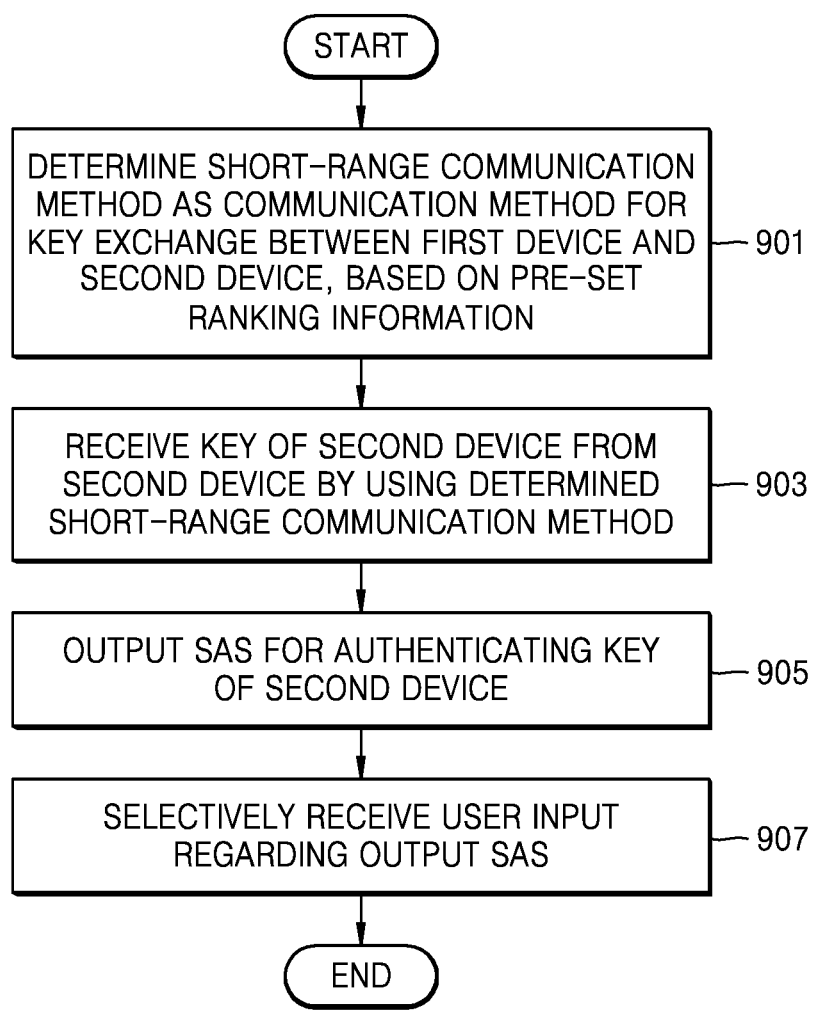
FIG. 9 is a detailed flowchart of a key exchange method according to an embodiment.

FIG. 9 is a detailed flowchart of a key exchange method according to an embodiment.

In operation 901, a first device may determine a short-range communication method as a communication method for a key exchange between the first device and a second device, based on pre-set channel ranking information.

For example, the first device may include channel ranking information set such that a short-range communication method has a higher priority than a long-range communication method when the second device is located within a predetermined range of the first device. Alternatively, the first device may receive an input of selecting a communication method from a user of the first device, or may select a communication method with the second device through negotiation with the second device.

According to an embodiment, examples of the short-range communication method may include communication methods using various protocols, such as Bluetooth and NFC.

Also, according to an embodiment, the first device may perform procedures for setting a channel according to the short-range communication method determined in operation 901.

In operation 903, the first device may receive a key of the second device from the second device by using the determined short-range communication method. Also, the first device may transmit a key of the first device to the second device. Also, the first device may receive not only the key of the second device, but also sharing information about the key of the second device, or the first device may receive the key of the second device and generate the sharing information about the key of the second device.

In operation 905, the first device may output SAS for authenticating the key of the second device.

According to an embodiment, since the communication method determined in operation 901 is not an encrypted communication method, the first device may perform an authentication process to determine whether the received key of the second device is accurate. According to an embodiment, the first device may determine a method of authenticating the key of the second device based on the communication method determined in operation 901.

For example, when the short-range communication method is used, it is obvious that the second device is located within the predetermined range of the first device, the first device may select an authentication method using SAS.

According to an embodiment, the first device may determine SAS based on the key of the second device, and output the determined SAS. In other words, the first device may calculate or extract SAS from the key of the second device through a predetermined algorithm, or may output a predetermined image, text, or video by using a value calculated or extracted from the key of the second device.

Here, according to an embodiment, even when the first device selected the short-range communication method, the first device may select an authentication method using SMS. Also, the key of the second device or the sharing information about the key of the second device may include information for determining an authentication method, and the first device may select an authentication method for the key of the second device based on the information for determining an authentication method included in the key of the second device or the sharing information about the key of the second device.

In addition, according to an embodiment, an authentication method according to a communication method may be determined according to information pre-set in the first device or based on user's selection.

In operation 907, the first device may selectively receive a user input regarding the output SAS.

According to an embodiment, the second device may output SAS based on the key of the second device transmitted by the second device. Since a user of the first device may determine whether the SAS output to the second device and the SAS output to the first device are the same, the first device may receive the user input regarding the SAS output by the first device. In other words, the first device may receive an input about whether the key of the second device is accurate.

Alternatively, the first device may receive information about the SAS output by the second device from the second device, and thus may determine whether the key of the second device is accurate without having to receive the user input.

Figure 10:
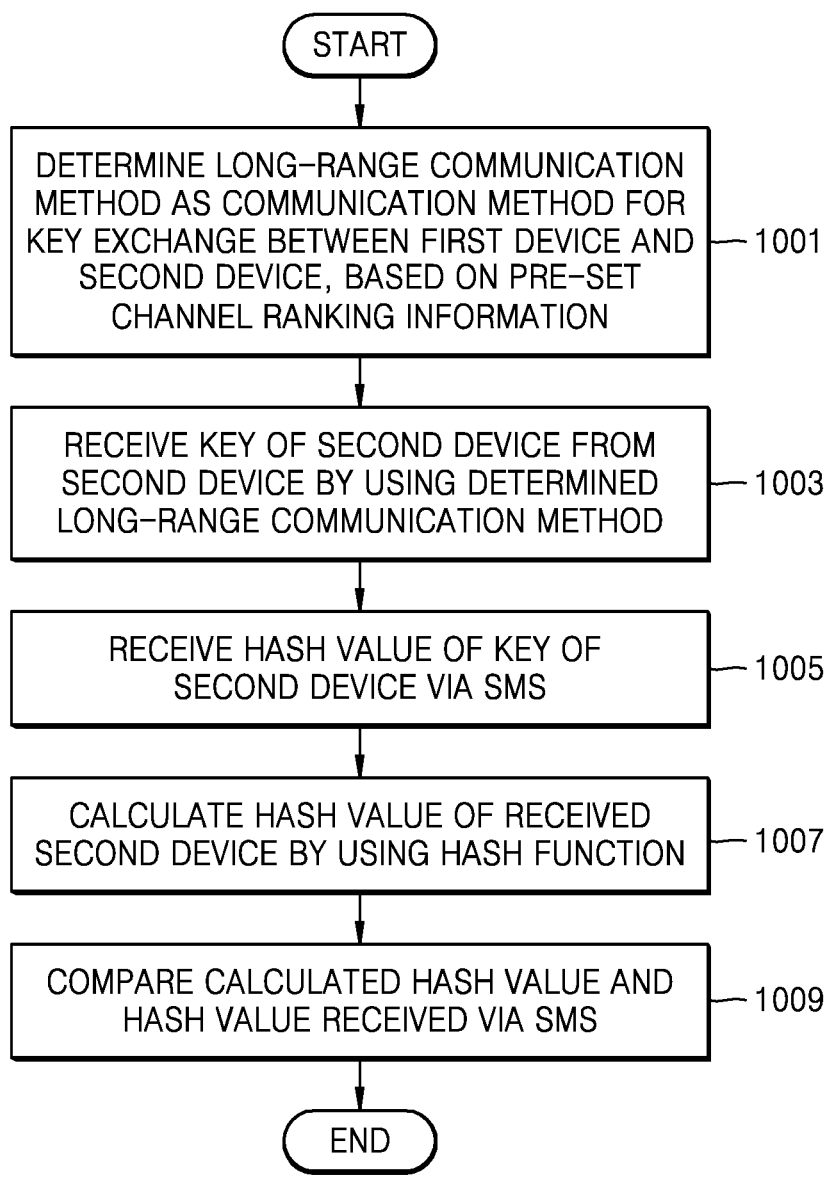
FIG. 10 is a detailed flowchart of a key exchange method according to an embodiment.

FIG. 10 is a detailed flowchart of a key exchange method according to an embodiment.

In operation 1001, a first device may determine a long-range communication method as a communication method for a key exchange between the first device and a second device, based on pre-set channel ranking information For example, the first device may include channel ranking information set such that a long-range communication method that is communicable regardless of a distance has a high priority when the second device is not located with a predetermined range of the first device. Alternatively, the first device may receive an input of selecting a communication method from a user of the first device, or may select a communication method with the second device through negotiation with the second device.

According to an embodiment, examples of the long-range communication method may include communication methods using various protocols, such as SMS and data communication using a cellular network, and a network, such as Wi-Fi.

Also, according to an embodiment, the first device may perform a procedure for setting a channel according to the long-range communication method determined in operation 1001.

In operation 1003, the first device may receive a key of the second device from the second device by using the determined long-range communication method. Also, the first device may transmit a key of the first device to the second device. Also, the first device may receive not only the key of the second device, but also sharing information about the key of the second device, or the first device may receive the key of the second device and generate the sharing information about the key of the second device.

In operation 1005, the first device may receive a hash value of the key of the second device via SMS. Also, the first device may transmit a hash value of the key of the first device to the second device via SMS.

According to an embodiment, since the communication method determined in operation 1001 is not an encrypted method, the first device may perform an authentication process to determine whether the received key of the second device is accurate. According to an embodiment, the first device may determine a method of authenticating the key of the second device based on the communication method determined in operation 901.

According to an embodiment, in operation 1003, the first device may receive the key of the second device by using a general data communication method via a cellular network. In operation 1005, the first device may receive the hash value of the key of the second device via SMS. Since SMS is exchanged by using a communication method used while transmitting/receiving control information of a network, the SMS may be different from a general data communication method for receiving the key of the second device in operation 1003.

In operation 1007, the first device may calculate a hash value of the second device received in operation 1003, by using a hash function.

According to an embodiment, the first and second devices may use the same hash function. Accordingly, when the key of the second device is identical, the hash value of the key of the second device calculated by the first device and the hash value of the key of the second device calculated by the second device may be the same.

In operation 1009, the first device may compare the calculated hash value and the hash value received via SMS.

In other words, when the hash value calculated by the first device based on the key of the second device received in operation 1003 is the same as the hash value of the key of the second device received via SMS in operation 1005, the first device may determine that the key of the second device is accurate. Also, the first device may output the calculated hash value of the key of the second device and the hash value of the key of the second device received from the second device via SMS, and selectively receive a user input based on a result of the output.

Figure 11:
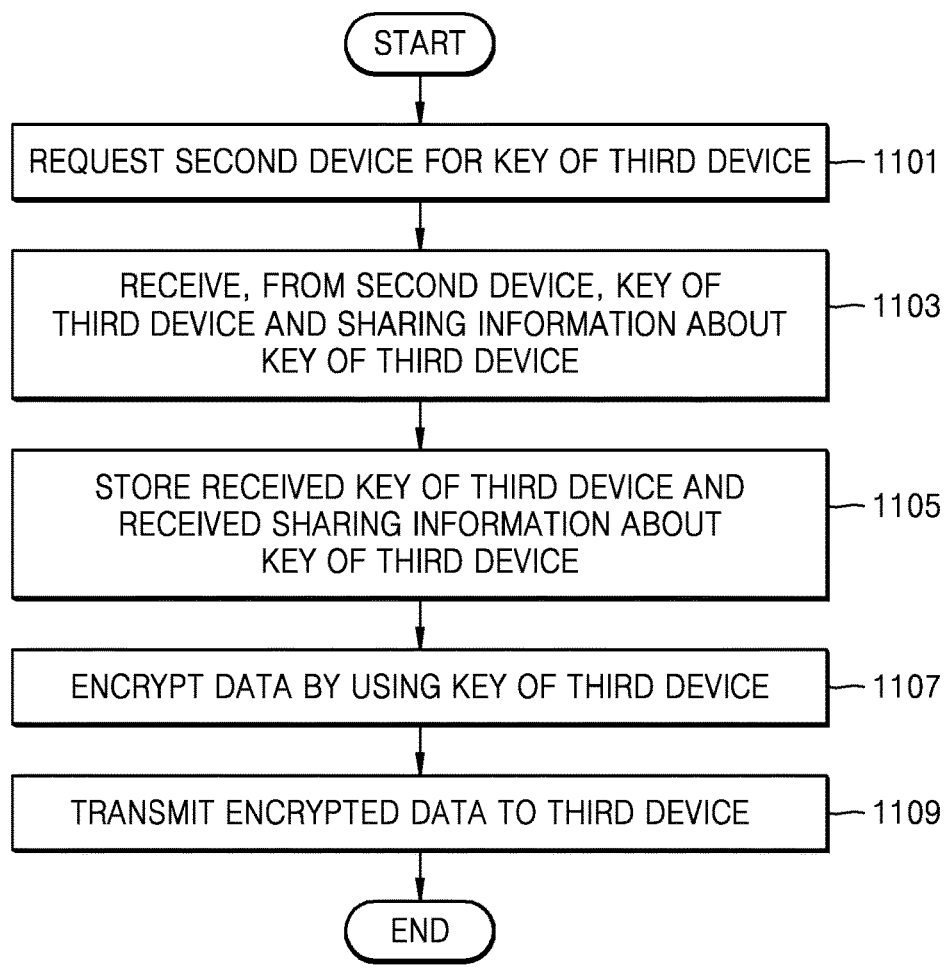
FIG. 11 is a detailed flowchart of a key sharing method according to an embodiment.

FIG. 11 is a detailed flowchart of a key sharing method according to an embodiment.

In operation 1101, a first device may request a second device for a key of a third device. Operation 1101 corresponds to operation 601 of FIG. 6.

In operation 1103, the first device may receive, from the second device, the key of the third device and sharing information about the key of the third device. Operation 1103 corresponds to operation 603 of FIG. 6

In operation 1105, the first device may store the received key of the third device and the received sharing information about the key of the third device. In addition, according to an embodiment, the first device may determine an authentication method described above to store the key of the third device, and perform authentication. Operation 1105 may correspond to operation 605 of FIG. 6.

In operation 1107, the first device may encrypt data by using the key of the third device.

According to an embodiment, the first device may encrypt data to be transmitted to the third device by using the key of the third device.

In operation 1109, the first device may transmit the encrypted data to the third device.

In other words, according to an embodiment, the first device may perform encrypted communication with the third device by receiving the key of the third device, which is stored in the second device, without having to receive the key of the third device directly from the third device.

Figure 12:
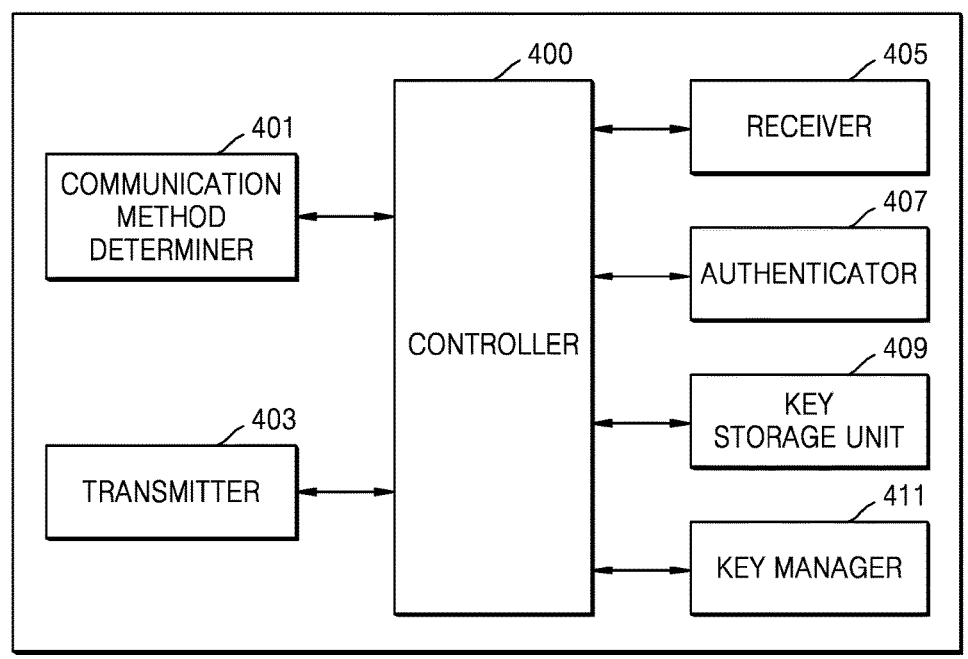
FIG. 12 is a detailed block diagram of a device according to an embodiment.

FIG. 12 is a detailed block diagram of a device according to an embodiment.

According to an embodiment, the first device 101 for performing key sharing and a key exchange may include the communication method determiner 401, the transmitter 403, the receiver 405, the authenticator 407, the key storage unit 409, a key manager 411, and the controller 400.

According to an embodiment, the communication method determiner 401 may determine a communication method for a key exchange with a second device, based on pre-set channel ranking information, as described above with reference to FIG. 4.

According to an embodiment, the transmitter 403 may transmit, to the second device, at least one of a key of the first device, sharing information about the key of the first device, a key of another device, which is stored in the first device, sharing information about the key of the other device, which is stored in the first device, and data.

Also, according to an embodiment, the transmitter 403 may request the second device for a key of the second device, sharing information about the key of the second device, a key of another device, which is stored in the second device, and sharing information about the key of the other device, which is stored in the second device. Such operations of the transmitter 403 may correspond details described with reference to FIGS. 4 and 7.

According to an embodiment, the receiver 405 may receive, from the second device, at least one of the key of the second device, the sharing information about the key of the second device, the key of the other device, which is stored in the second device, the sharing information about the key of the other device, which is stored in the second device, and data.

Also, according to an embodiment, the receiver 405 may receive a request from the second device for the key of the first device, the sharing information about the key of the first device, the key of the other device, which is stored in the first device, and the sharing information about the key of the other device, which is stored in the first device. Such operations of the receiver 405 may correspond to details described with reference to FIGS. 4 and 7.

According to an embodiment, the authenticator 407 may determine an authentication method for a key received from the second device, and perform authentication. Such operations of the authenticator 407 may correspond to details described with reference to FIG. 4.

According to an embodiment, the key storage unit 409 may store a received key of a device (the key of the second device or the key of the other device). Also, the key storage unit 409 may store received sharing information about a key of a device (the sharing information about the key of the second device or the sharing information about the key of the other device). Such operations of the key storage unit 409 may correspond to details described with reference to FIG. 7.

According to an embodiment, the key manager 411 may generate or update sharing information about a key of a device, which is stored in the first device.

According to an embodiment, the key manager 411 may generate sharing information about the key of the second device, which is received by the receiver 405. Also, the key manager 411 may generate sharing information about the key of the first device, which is to be provided to the second device. In addition, the key manager 411 may update sharing information about a key of a third device, which is received from the second device.

For example, the key manager 411 may add the first device 101 to sharing history information of the key of the second device. In other words, information indicating that the key of the second device is transmitted from the second device to the first device may be added. In addition, when the first device transmits the key of the second device to the third device, the key manager 411 may update the sharing history information of the key of the second device to include information indicating that the key of the second device is provided to the third device from the second device through the first device.

In addition, the key manager 411 may back up or discard a key of a device, which is stored in the first device.

Also, according to an embodiment, the key manager 411 may determine reliability of a key of at least one device, which is stored in the first device, based on sharing history information. For example, when the first device stores information indicating that a fourth device is an unidentifiable device or has low reliability, the first device may determine reliability of a key of a device, which is received through the fourth device, to be low based on sharing history information about the key of the device.

In other words, according to an embodiment, a user of the first device may determine the reliability of a key of each device by directly referring to sharing history information, and may set policy information for key management of the first device according to reliability information or settings of a user of each device, which is received from an external source, such that a key of a device received through an unknown device or through a device having low reliability is not received or is discarded. Accordingly, the key manager 411 may manage a key of at least one device stored in or received by the first device.

Figure 13:
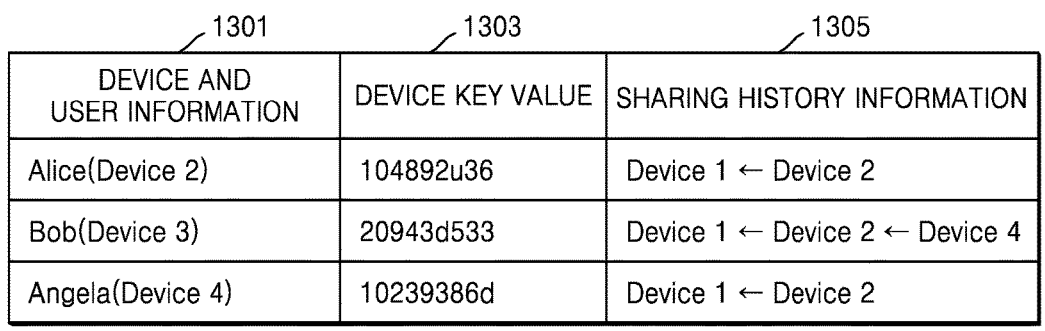
FIG. 13 is a table for describing sharing information about a key, according to an embodiment.

FIG. 13 is a table for describing sharing information about a key, according to an embodiment.

Sharing information about a key of a device, which is shown in FIG. 13, may be sharing information about a key of a device, which is stored in a first device. Also, according to an embodiment, the sharing information about a key of a device may be stored in a form of a list as shown in FIG. 13.

As described above, sharing information about a key of a device may include at least one of information of the device, information about a user of the device, and sharing history information, and may further include at least one of validity date information about the key of the device and a hash value of the key of the device. Also, the sharing information may be mapped to and stored with a key value of the device.

According to an embodiment, a device and user information field 1301 includes information about a user of a device and about the device. Referring to FIG. 13, a second device is used by Alice, a third device is used by Bob, and a fourth device is used by Angela. In addition, when an identifier, such as a phone number or an internet protocol (IP) address, is assigned to a device, the identifier may also be included in the device and user information field.

According to an embodiment, a device key value field 1303 may include information indicating the whole key of a device. In addition, the device key value field may also include a hash value of a device, as well as the key of the device.

According to an embodiment, a sharing history information field 1305 may include information for identifying a sharing order of a key of a device and devices sharing the key of the device. Referring to FIG. 13, a key of the second device is transmitted from the second device to the first device, and a key of the third device is transmitted to the first device through the fourth device and the second device.

According to an embodiment, the first device may determine reliability of a key of at least one device, which is stored in the first device, based on sharing history information. For example, when the first device stores information indicating that the fourth device is an unidentifiable device or has low reliability, the first device may determine reliability of a key of a device, which is received through the fourth device, to be low based on sharing history information about the key of the device.

Figure 14:
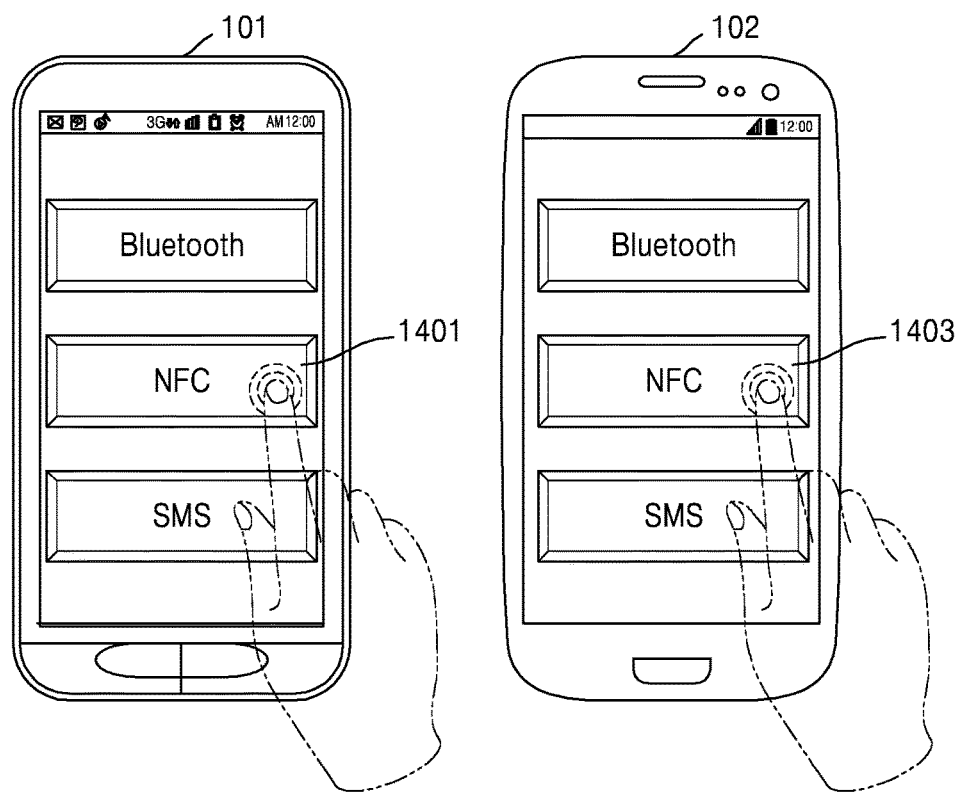
FIG. 14 illustrates an example of a method of determining a communication method, according to an embodiment.

FIG. 14 illustrates an example of a method of determining a communication method, according to an embodiment.

FIG. 14 illustrates an example of a method of determining a communication method for a key exchange between a first device and a second device.

According to an embodiment, the first device 101 may select a communication method for a key exchange with the second device 102 based on pre-set channel ranking information.

FIG. 13 shows a case in which pre-set channel ranking information stored in the first device 101 includes information indicating that a communication method is determined based on a user input. Accordingly, in FIG. 13, the first device 101 may determine a communication method based on a user input.

Referring to FIG. 14, the first device 101 receives a user input of selecting an NFC method 1401. As described above, the first device 101 may determine a communication method through negotiation with the second device 102. Accordingly, the second device 102 may also receive a user input of selecting a communication method from a user. Referring to FIG. 14, the second device may also receive a user input of selecting an NFC method 1403.

Also, when the communication method determined according to the user input received by the first device 101 and the communication method determined according to the user input received by the second device 102 are different from each other, the first device 101 or the second device 102 may output a message notifying or receiving confirmation that a key exchange procedure is to be performed by using a communication method determined according to a distance between the first and second devices 101 and 102, and perform the key exchange procedure by using the determined communication method.

Figure 15:
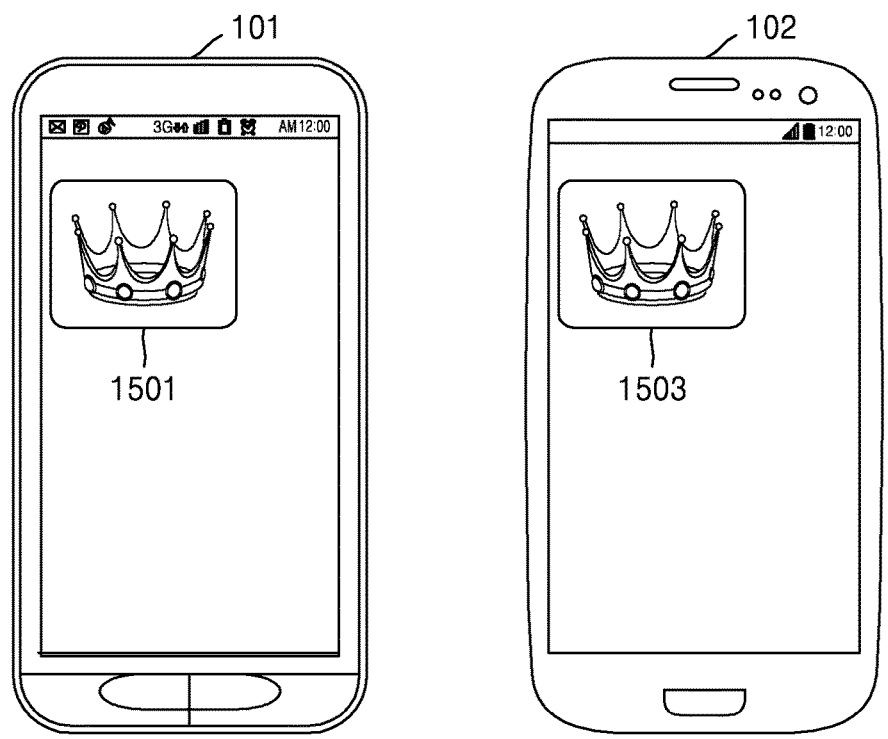
FIG. 15 illustrates an example of a key authentication method according to an embodiment.

FIG. 15 illustrates an example of a key authentication method according to an embodiment.

According to an embodiment, when a key exchange between the first device 101 and the second device 102 uses short-range communication, the first device 101 may use an authentication method according to SAS, as an authentication method of a key of the second device received from the second device 102.

Referring to FIG. 15, an image output by the first device 101 is SAS, and may be SAS determined based on the key of the second device received from the second device. An image output by the second device 102 is also SAS, and may be SAS determined based on the key of the second device transmitted to the first device.

According to an embodiment, SAS may be an image as shown in FIG. 15, but may alternatively be at least one of an image, text, and a video, or a combination of at least two of an image, text, and a video.

According to an embodiment, the second device 102 may transmit, to the first device, information about SAS determined based on the key of the second device, and the first device 101 may compare SAS information received from the second device 102 and SAS information determined b the first device 101 to authenticate the key of the second device.

Also, according to an embodiment, the first device 101 may selectively receive an input from a user according to an authentication result. In other words, the first device 101 may complete authentication by receiving, from a user, an input about a result of determining whether the key of the second device received by the first device 101 is accurate by comparing the SAS output by the second device 102 and the SAS output by the first device 101 with naked eyes.

In addition, according to an embodiment, the first device 101 or the second device 102 may output an authentication result of the key of the first device or the key of the second device.

Figure 16:
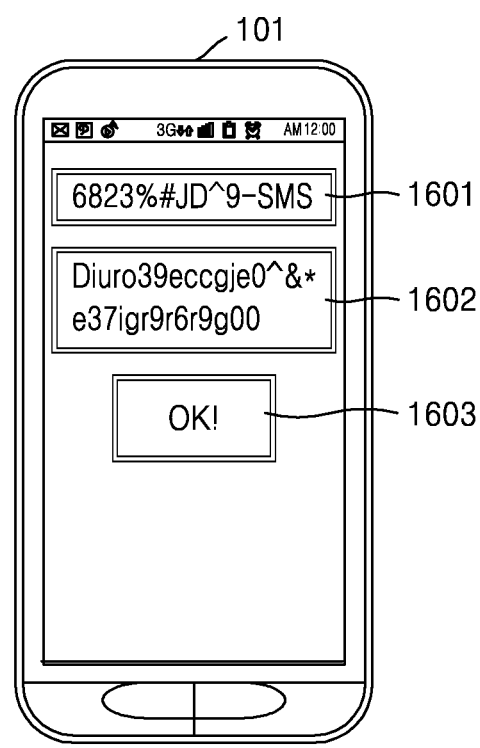
FIG. 16 illustrates an example of a key authentication method according to an embodiment.

FIG. 16 illustrates an example of a key authentication method according to an embodiment.

According to an embodiment, when a key exchange between the first device 101 and the second device 102 uses long-range communication, the first device 101 may use an authentication method according to SMS, as an authentication method of a key of the second device received from the second device 102.

As described above, the first device 101 may receive a hash value 1601 of the key of the second device via SMS, from the second device 102. Also, the first device 101 may receive a key 1602 of the second device by using a general data communication method from the second device.

According to an embodiment, the first device 101 may calculate a hash value of the key 1602 of the second device by using a hash function, and output a notification message 1603 outputting an authentication result based on a calculation result.

Here, according to an embodiment, the second device 102 may also authenticate a key of the first device received from the first device 101, in the same manner.

Figure 17:
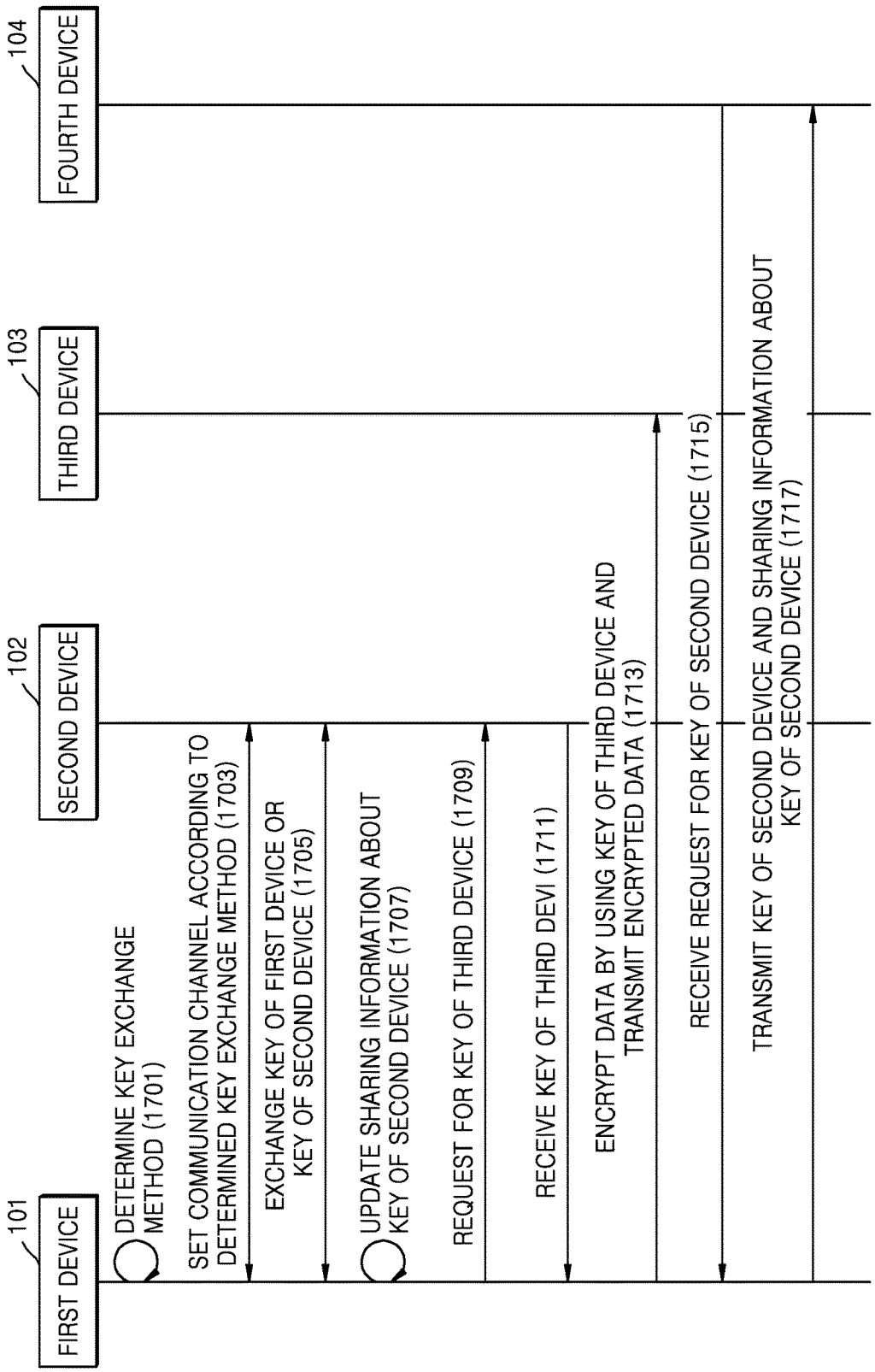
FIG. 17 is a flowchart of key exchange and key sharing methods according to an embodiment.

FIG. 17 is a flowchart of key exchange and key sharing methods according to an embodiment.

In operation 1701, the first device 101 may determine a key exchange method. In other words, the first device 101 may determine a communication method for exchanging a key of a device with the second device 102. A communication method according to an embodiment includes both a short-range communication method and a long-range communication method, and is not limited. As described above, the key exchange method may be determined through negotiation with the second device.

In operation 1703, the first device 101 and the second device 102 may set a communication channel according to the communication method determined in operation 1701.

In operation 1705, the first device 101 and the second device may exchange keys of the first and second devices by using the set communication channel. In addition, the first and second devices 101 and 102 may exchange not only a key of a device, but also sharing information about the key of the device.

In operation 1707, the first device 101 may update the sharing information about the key of the second device received in operation 1705. Here, the first device 101 may generate the sharing information about the key of the second device.

In operation 1709, the first device 101 may request the second device for a key of a third device.

In operation 1711, the first device 101 may receive, from the second device, the key of the third device. Here, the first device 101 may also receive, from the second device, sharing information about the key of the third device.

In operation 1713, the first device 101 may encrypt data by using the key of the third device received in operation 1711, and transmit the encrypted data to the third device 103.

In operation 1715, the first device 101 may receive, from a fourth device 104, a request for a key of the second device. In other words, the first device 101 may receive, from the fourth device 104, a request for a key of another device, which is stored in the first device.

In operation 1717, the first device 101 may transmit, to the fourth device 104, the key of the second device and the sharing information about the key of the second device.

Figure 18:
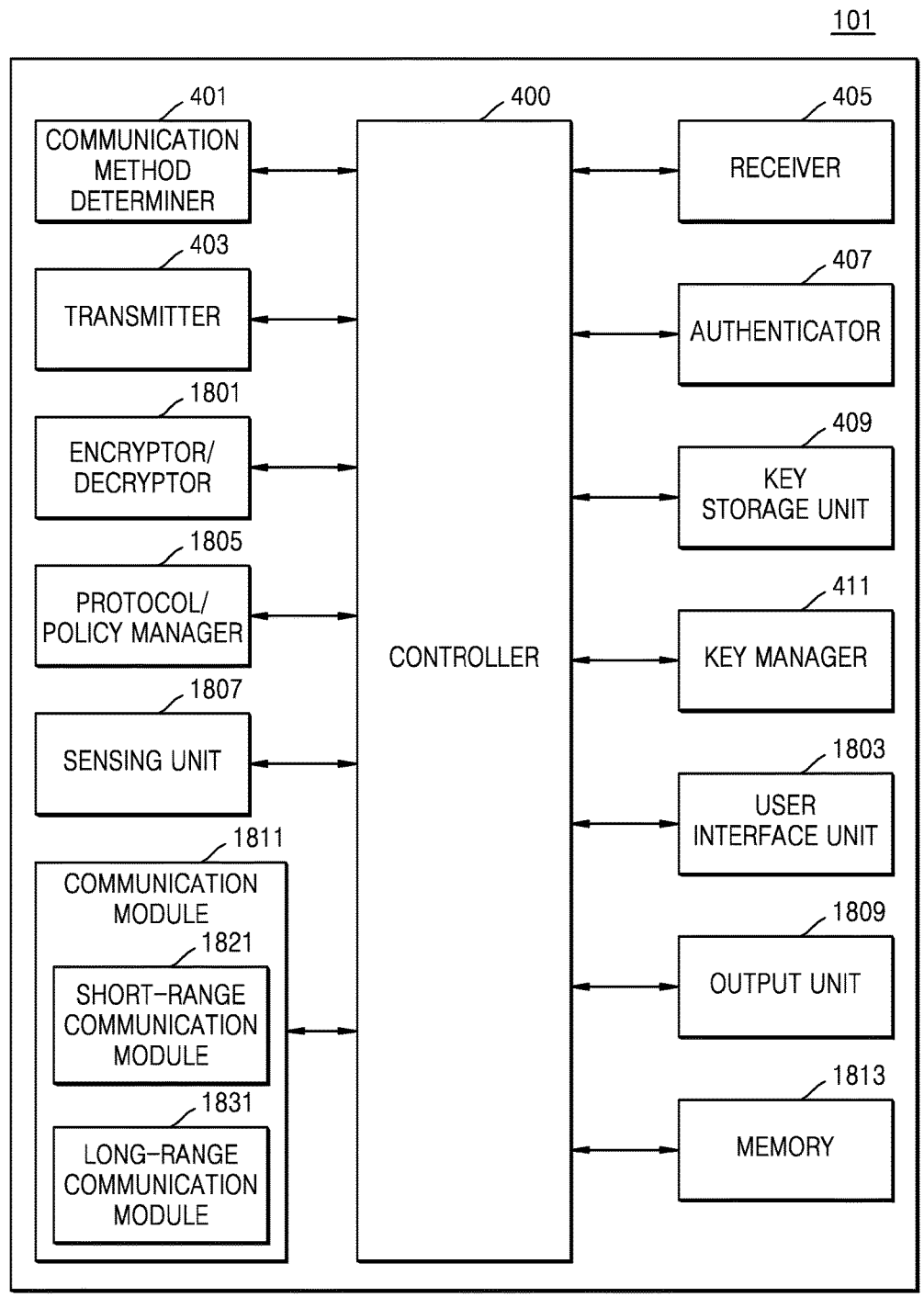
FIG. 18 is a detailed block diagram of a device according to an embodiment.

FIG. 18 is a detailed block diagram of a device according to an embodiment.

According to an embodiment, the first device 101 may include the communication method determiner 401, the transmitter 403, the receiver 405, the authenticator 407, the key storage unit 409, the key manager 411, an encryptor/decryptor 1801, a user interface unit 1803, a protocol/policy manager 1805, a sensing unit 1807, an output unit 1809, a communication module 1811, and a memory 1813.

According to an embodiment, the first device may be a mobile device, such as a cellular phone, a smart phone, a PMP, a tablet PC, an MP3 player, or a navigation device, or a home device, such as a PC, a laptop computer, a TV, a monitor, or a refrigerator, but is not limited thereto.

According to an embodiment, since the communication method determiner 401, the transmitter 403, the receiver 405, the authenticator 407, the key storage unit 409, and the key manager 411 correspond to those described in FIG. 12, details thereof are not provided again.

According to an embodiment, the encryptor/decryptor 1801 may encrypt data by using a key of a device, and decrypt received encrypted data. According to an embodiment, the key of the device used by the encryptor/decryptor 1801 may include all of a public key, a secret key, a symmetric key, and an asymmetric key as described above.

According to an embodiment, the user interface unit 1803 receives an input from a user, and may include, for example, a keyboard, a touch pad, a touch screen, a mouse, a track ball, an electronic pen, or the like, but the user interface unit 1803 is not limited thereto.

According to an embodiment, the protocol/policy manager 1805 may manage a protocol related communication of a device and manage a policy related to a key of the device. According to an embodiment, the policy related to the key of the device may include management policy of the key of the device according to reliability of the key of the device, management policy of the key of the device according to a validity date, etc., and is not limited thereto.

According to an embodiment, the sensing unit 1807 may include various sensors, such as a global positioning system (GPS), an acceleration sensor, a proximity sensor, a pressure sensor, and an illumination sensor. In addition, the sensing unit 1807 may detect a state of the first device and an event generated in the first device, based on information received from an external device, such as a server.

According to an embodiment, the output unit 1809 outputs an audio signal, a video signal, or a vibration signal, and may include a display unit, such as a screen, an audio output unit, such as a speaker, and a vibration motor.

According to an embodiment, the output unit 1809 may output a determined communication method, information about a determined authentication method, information about an authentication result, a key of a device, and sharing information about a key of a device, but is not limited thereto.

According to an embodiment, the communication module 1811 may include a short-range communication module 1821 and a long-range communication module 1831. The communication module 1811 may be a unit that communicates with another device by using the transmitter 403 and the receiver 405 according to control of the communication method determiner 401.

Figure 19:
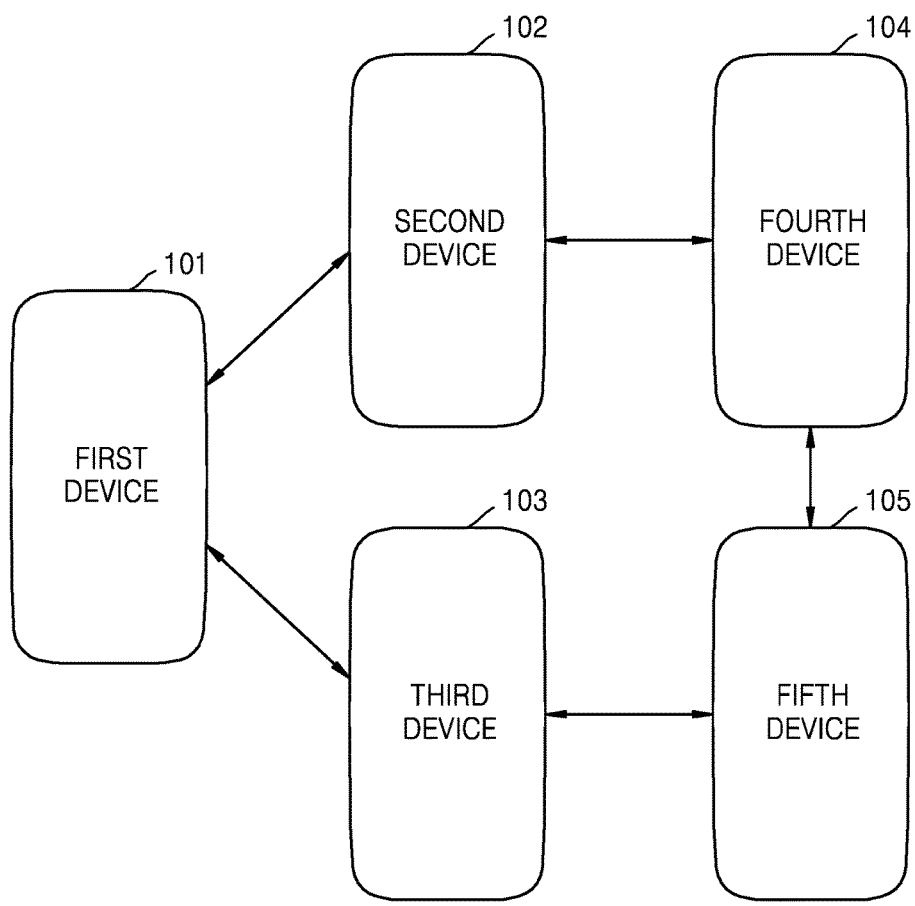
FIG. 19 illustrates a system for describing key exchange and sharing methods between devices, according to an embodiment.

FIG. 19 illustrates a system for describing key exchange and sharing methods between devices, according to an embodiment.

According to an embodiment, the first and second devices 101 and 102 may exchange keys. Also, the first device 101 may exchange a key with the third device 103. Also, the second device 102 may exchange a key with the fourth device 104, and the third device 103 may exchange a key with a fifth device 105. In addition, the fifth device 105 may exchange a key with the fourth device 104.

As described above, the first through fifth devices 101 through 105 may store a key of another device via key exchanges. Also, the first through fifth devices 101 through 105 may share a key of another device through key exchange processes therebetween. In other words, since the third device 103 exchanged a key with the fifth device 105, the third device 103 is storing the key of the fifth device 105, and may share the key of the fifth device 105 with the first device 101. If the third device 103 received the key of the fourth device 104 from the fifth device 105, the third device 103 may also share the key of the fourth device 104 with the first device 101. In other words, the third device 103 may store a key of each of a plurality of devices, and may share the keys of the plurality of devices stored in the third device 103 with another device (for example, the first device 101).

According to an embodiment, the first device 101 may perform encryption communication by using the key of the fifth device 105 and the key of the fourth device 104, which are received from the third device 103. In other words, according to an embodiment, the first device 101 may perform encrypted communication with the fourth device 104 or the fifth device 105 by using the key of the fourth device 104 or the fifth device 105, which is received from the third device 103, without having to directly exchange a key with the fourth device 104 or the fifth device 105. However, it is obvious that the first device 101 may also directly exchange a key with the fourth or fifth device 104 or 105.

Also, according to an embodiment, the fifth device 101 may select and store at least one of a plurality of keys (the key of the fourth device and the key of the fifth device) shared by the third device 103.

In addition, according to an embodiment, the first device 101 may receive sharing information about the key of the fourth or fifth device 104 or 105 from the third device 103. Such an operation of the first device 101 corresponds to details described in FIGS. 1 through 18.

In addition, the first device 101 may determine reliability levels of the keys of the third, fourth, and fifth devices 103, 104, and 105, based on sharing history information. Here, the first device 101 may receive, from the third device 103, information about the reliability levels of the keys of the fourth and fifth devices 104 and 105, which are determined by the third device 103, and may determine the reliability levels of the keys of the fourth and fifth devices 104 and 105 based on the information about the reliability levels received from the third device 103.

In addition, according to an embodiment, the first device 101 may manage a received key of at least one device, as described above.

FIG. 20 is a table for describing sharing history information and reliability level information about a key, which are stored in a first device, according to an embodiment.

According to an embodiment, the first device may store sharing information about a key of a device, and the sharing information about a key of a device may include a device and user information field 2001, a key ID information field 2003, a validity date information field 2005, and a sharing history information field 2007. In addition, the first device may store a reliability level information field 2009. Here, the reliability level information field 2009 may be included in the sharing information.

In addition, the sharing information may further include information about devices sharing the key of the device, hash value information of the key of the device, etc., and is not limited thereto. Also, the sharing information of FIG. 20 is another example of the sharing information of FIG. 13, and the sharing information may be stored as shown in FIG. 13 or 20 according to user settings or device settings. Also, only some of information shown in the sharing information of FIG. 13 or 20 may be stored.

According to an embodiment, information about a key of a device may be stored in a form of a list as shown in FIG. 20. Also, sharing information about a key of a device may be mapped to and stored with a key value of the device.

According to an embodiment, the device and user information field 2001 may include information about a user of a device and about the device. Since details thereof correspond to those described above, the details thereof are not provided again.

According to an embodiment, the key ID information field 2003 may include information about an ID for identifying a key.

According to an embodiment, the validity date information field 2005 may include information about a validity date of a stored key. According to an embodiment, the validity date may be a predetermined period of time after a key is received, may be set by a user of a device, or may be set by an authentication agency, but is not limited thereto.

According to an embodiment, the sharing history information field 2007 may include information for identifying a sharing order of a key of a device and identifying devices sharing the key of the device. Details thereof correspond to those described above.

According to an embodiment, the reliability level information field 2009 may include information about a reliability level of a key, which is determined by a first device based on sharing history information about the key. Here, the first device may determine the information about the reliability level based not only on the sharing history information, but also on entire sharing information.

Referring to FIGS. 19 and 20, the first device directly received a key of a second device from the second device. Accordingly, a reliability level may be determined to be 0. In other words, since the first device received the key of the second device without it having passed through any other device, the first device may determine the key of the second device as having the highest reliability. The first device may determine a key of a third device in the same manner as the key of the second device. According to an embodiment, when a number indicating a reliability level is high, reliability is low. Here, the reverse is possible.

However, the first device did not directly exchange a key with a fifth device, but has received a key of the fifth device from the third device. Accordingly, a reliability level may be 1. In other words, since the first device received the key of the fifth device through the third device, the first device may determine that the key of the fifth device has reliability lower than a key received directly.

In addition, the first device received a key of a fourth device through two paths. Referring to FIGS. 19 and 20, the first device received the key of the fourth device from the second device, and received the key of the fourth device from fifth device through the third device. The first device may differently determine a reliability level according to a received path, but when the reliability level is different, the first device may determine a highest reliability level as a reliability level of a key. Alternatively, the first device may determine an average of the different reliability levels as the reliability level of the key. A method of determining a reliability level of a key of a device, which is received through several paths may vary according to settings of the device according to a user input.

Also, according to an embodiment, when a key of a device is received through several paths, the first device may compare the received keys to determine whether the received keys are normal.

According to an embodiment, a reliability level may be determined based on sharing information. In other words, a reliability level may be determined based on the number of devices a key of a device passed through. Also, a reliability level may be determined in consideration of whether a received key is a key of a user's device or whether a device that exchanged a key has exchanged a key before, based on address book information stored in the first device.

For example, even when a key of a device is received through two devices, if the device has directly transmitted the key before, a reliability level may be determined to be 2. When a device is stored in an address book but has never directly exchanged a key, a reliability level may be determined to be 3, and when a device is not stored in an address book, a reliability level may be determined to be 4. Here, a reliability level may be determined based on information about whether a key has been received at least once before through another device, instead of a history of directly exchanging a key.

In other words, according to an embodiment, a criterion of determining a reliability level may vary according to settings of a device according to a user input.

In addition, according to an embodiment, the first device may neither receive nor store a key of a device according to a determined reliability level. In other words, the first device may first receive only sharing information about a key of a predetermined device to determine a reliability level, and may not receive the key of the predetermined device based on the determined reliability level. Here, the first device may receive the key of the device and the sharing information about the key of the device, determine a reliability level based on sharing history information included in the received sharing information, and determine whether to store the key of the device.

According to an embodiment, the memory 1813 may include any type of memory operating as a main memory or an auxiliary memory embedded in the device, such as a random-access memory (RAM), a flash memory, a hard disk, or a solid state disk (SSD).

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the preferred embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements of the present disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The use of the terms "a" and "an" and "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the present disclosure.

The invention claimed is:

1. A method, performed by a first device, of sharing a key, the method comprising:
   determining one of a plurality of different communication methods for exchanging a key between the first device and a second device, based on pre-set ranking information;
   receiving a key of the second device from the second device by using the determined communication method;
   determining one of a plurality of different authentication methods for authenticating the received key of the second device; and
   authenticating the received key using the determined authentication method, wherein
   the determining of one of a plurality of different authentication methods comprises determining to use a first authentication method based on the key being received from the second device using a short-range communication method and determining to use a second authentication method, different from the first authentication method, based on the key being received from the second device using a long-range communication method.

2. The method of claim 1, wherein, when the determined communication method is the short-range communication method, the authenticating of the key of the second device comprises:
   outputting a short authentication string (SAS) for authenticating the key of the second device; and
   selectively receiving an input regarding the output SAS.

3. The method of claim 1, wherein, when the determined communication method is the long-range communication method, the authenticating of the key of the second device comprises:
   receiving a hash value of the key of the second device via a short message service (SMS);
   calculating a hash value of the received key of the second device by using a hash function; and
   comparing the calculated hash value and the hash value received via the SMS.

4. The method of claim 1, wherein the pre-set ranking information comprises information about priorities of communication channels, which are determined based on at least one of preference information of the first device, information about a distance between the first and second devices, and channel information established between the first and second devices.

5. The method of claim 1, wherein the determining of the communication method further comprises setting a communication channel with respect to the second device according to the determined communication method, and
   the receiving of the key of the second device comprises:
   receiving the key of the second device through the set communication channel; and
   transmitting a key of the first device to the second device through the set communication channel.

6. The method of claim 1, further comprising:
   transmitting, to the second device, a request for a key of a third device;
   receiving, from the second device, the key of the third device and sharing information about the key of the third device;
   updating the sharing information about the key of the third device; and
   storing the key of the third device and the sharing information about the key of the third device.

7. The method of claim 1, further comprising:
   receiving, from the second device, a request for a key of a third device;
   updating sharing information about the key of the third device; and
   transmitting the key of the third device and the sharing information about the key of the third device.

8. The method of claim 1, further comprising:
   generating sharing information about the key of the second device; and
   storing the sharing information about the key of the second device.

9. The method of claim 8, wherein the sharing information about the key of the second device comprises sharing history information comprising information about devices sharing a key of a third device and information about a sharing order of the key of the third device.

10. A first device for sharing a key with a second device, the first device comprising:
    communication circuitry; and
    a processor configured to:
    determine one of a plurality of different communication methods for exchanging a key between the first and second devices, based on pre-set ranking information;
    control to transmit a key of the first device to the second device by using the determined communication method;
    control to receive a key of the second device from the second device by using the determined communication method;
    determine one of a plurality of a different authentication methods for authenticating the received key of the second device; and
    authenticate the received key using the determined authentication method, wherein
    the determining of one of a plurality of different authentication methods comprises determining to use a first authentication method based on the key being received from the second device using a short-range communication method and determining to use a second authentication method, different from the first authentication method, based on the key being received from the second device using a long-range communication.

11. The first device of claim 10, wherein the processor is configured to, when the determined communication method is the short-range communication method, control output a short authentication string (SAS) for authenticating the key of the second device, and selectively receive an input regarding the output SAS.

12. The first device of claim 10, wherein the processor is configured to, when the determined communication method is the long-range communication method, control to receive, through the communication circuitry, a hash value of the key of the second device via a short message service (SMS), calculate a hash value of the received key of the second device by using a hash function, and compare the calculated hash value and the hash value received via the SMS.

13. The first device of claim 10, further comprising key storage, wherein the key storage is configured to store the key of the second device based on a result of the authenticating.

14. A non-transitory computer-readable recording medium having recorded thereon a computer program, which, when executed by a computer of a first device for sharing a key with a second device, controls the first device to perform operations comprising:

determining one of a plurality of different communication methods for exchanging a key between the first device and a second device, based on pre-set ranking information;

receiving a key of the second device from the second device by using the determined communication method;

determining one of a plurality of different authentication methods for authenticating the received key of the second device; and authenticating the received key using the determined authentication method, wherein the determining of one of a plurality of different authentication methods comprises determining to use a first authentication method based on the key being received from the second device using a short-range communication method and determining to use a second authentication method, different from the first authentication method, based on the key being received from the second device using a long-range communication method.

* * * * *